(12) United States Patent
Uchino

(10) Patent No.: US 11,400,788 B2
(45) Date of Patent: Aug. 2, 2022

(54) AIR SUSPENSION SYSTEM

(71) Applicant: HITACHI ASTEMO, LTD., Ibaraki (JP)

(72) Inventor: Toru Uchino, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 17/279,117

(22) PCT Filed: Aug. 23, 2019

(86) PCT No.: PCT/JP2019/033043
§ 371 (c)(1),
(2) Date: Mar. 24, 2021

(87) PCT Pub. No.: WO2020/066398
PCT Pub. Date: Apr. 2, 2020

(65) Prior Publication Data
US 2021/0394577 A1    Dec. 23, 2021

(30) Foreign Application Priority Data

Sep. 25, 2018 (JP) .............................. JP2018-178770

(51) Int. Cl.
*B60G 17/052* (2006.01)

(52) U.S. Cl.
CPC .... *B60G 17/0525* (2013.01); *B60G 2202/152* (2013.01); *B60G 2202/154* (2013.01);
(Continued)

(58) Field of Classification Search
CPC .......... B60G 17/0525; B60G 2202/152; B60G 2202/154; B60G 2400/252;
(Continued)

(56) References Cited

U.S. PATENT DOCUMENTS

| 7,484,747 B2* | 2/2009 | Geiger | B60G 17/0155 |
| | | | 280/124.157 |
| 2004/0188970 A1* | 9/2004 | Matern | B60G 17/0523 |
| | | | 280/124.16 |

(Continued)

FOREIGN PATENT DOCUMENTS

| DE | 102014218296 A1 | 3/2016 |
| JP | 57-194815 U | 12/1982 |

(Continued)

OTHER PUBLICATIONS

International Search Report dated Oct. 8, 2019 for WO 2020/066398 A1 (3 pages).

(Continued)

*Primary Examiner* — Toan C To
(74) *Attorney, Agent, or Firm* — Venjuris, P.C.

(57) ABSTRACT

An air suspension system includes: an air suspension interposed between a vehicle body and an axle to adjust a vehicle height according to supply and exhaust of air; a compressor that compresses air; a tank that stores the air compressed by the compressor; and an air dryer provided on an ejection side of the compressor. When the tank has a predetermined pressure or less after air is supplied from the tank to the air suspension, a pressure of the tank is increased by the compressor.

9 Claims, 13 Drawing Sheets

(52) U.S. Cl.
CPC .............. *B60G 2400/252* (2013.01); *B60G 2400/51222* (2013.01); *B60G 2400/61* (2013.01); *B60G 2400/8422* (2013.01); *B60G 2500/205* (2013.01); *B60G 2500/30* (2013.01); *B60G 2600/66* (2013.01)

(58) Field of Classification Search
CPC ...... B60G 2400/51222; B60G 2400/61; B60G 2400/8422; B60G 2500/205; B60G 2500/30; B60G 2600/66
USPC ........ 280/5.514, 124.157, 124.158, 124.159, 280/124.16
See application file for complete search history.

(56) References Cited

U.S. PATENT DOCUMENTS

| | | | | |
|---|---|---|---|---|
| 2006/0043691 A1* | 3/2006 | Geiger | ............... | B60G 17/0155 280/124.16 |
| 2006/0049606 A1* | 3/2006 | Geiger | ............... | B60G 17/0523 280/124.157 |
| 2018/0079273 A1* | 3/2018 | Ito | ......................... | B60G 17/048 |
| 2018/0304718 A1* | 10/2018 | Seto | ....................... | B60G 11/27 |
| 2019/0084365 A1* | 3/2019 | Oishi | .................... | B01D 53/261 |
| 2019/0275854 A1* | 9/2019 | Kobayashi | ........... | B60G 17/052 |

FOREIGN PATENT DOCUMENTS

| | | |
|---|---|---|
| JP | 2007-182197 A | 7/2007 |
| JP | 2009-046027 A | 3/2009 |
| JP | 2012-516256 A | 7/2012 |
| JP | 2012-180020 A | 9/2012 |

OTHER PUBLICATIONS

An Office Action dated Apr. 16, 2022, issued from the Japanese Patent Office (JPO) of Japanese Patent Application No. 2020-548182 and a Machine translation thereof. (7 pages).

An Office Action dated Feb. 28, 2022, issued from the German Patent and Trade Mark Office (DPMA) of German Patent Application No. 11201904247 and a EN translation thereof. (11 pages).

\* cited by examiner

… (1) …

AIR SUSPENSION SYSTEM

CROSS REFERENCE TO RELATED APPLICATIONS

This application is a national phase of PCT application No. PCT/JP2019/033043, filed on 23 Aug. 2019, which claims priority from Japanese patent application No. 2018-178770, filed on 25 Sep. 2018, all of which are incorporated herein by reference.

TECHNICAL FIELD

The present disclosure relates to an air suspension system mounted on a vehicle, for example, a four-wheeled vehicle.

BACKGROUND

There are an open type and a closed type for an air suspension system for adjusting the height of a vehicle. The open type air suspension system has advantages that the system has a simple configuration, which may reduce the number of components. However, in the open type air suspension system, air is compressed from the atmospheric pressure state, and thus, it takes time to boost the compressed air to a required pressure. Meanwhile, in the closed type air suspension system, the pressure of a sucked air may be higher than the atmospheric pressure (Patent Document 1). As a result, the closed type air suspension system has an advantage that the compressed air may be boosted to a required pressure in a short time.

PRIOR ART DOCUMENT

Patent Document

Patent Document 1: Japanese Laid-Open Patent Publication No. 2012-516256

SUMMARY OF THE INVENTION

Problem to be Solved

In the closed type air suspension system, however, when a vehicle is left stopped (parked) for a long time, compressed air may be leaked from, for example, an air suspension or a seal part of an air pipe, and the vehicle height may be lower than a reference height (reference vehicle height). In this case, when the vehicle ignition is turned on, a compressor in the air suspension system performs a control to adjust the vehicle height to the reference height. As a result, the compressed air inside a tank that stores compressed air is used for adjusting to the reference vehicle height, and thus, the pressure of the tank is reduced. Thereafter, when a load weight increases by luggage or occupants and the vehicle height is lowered, the compressor cannot take in air from the tank in the low-pressure state, and the atmosphere (outside air) is compressed for use. As a result, there is a problem that it takes extra time to raise the vehicle height to the reference height again.

An embodiment of the present disclosure is to provide an air suspension system capable of shortening a vehicle height adjustment time and stabilizing the vehicle.

Means to Solve the Problem

An air suspension system according to an embodiment of the present disclosure includes: an air suspension interposed between a vehicle body and an axle and configured to adjust a vehicle height according to supply and exhaust of air; a compressor configured to compress air; a tank configured to store the air compressed by the compressor; and an air dryer provided on an ejection side of the compressor. When a pressure of the tank is a predetermined pressure or less after air is supplied from the tank to the air suspension, the pressure of the tank is increased by the compressor.

Effect of the Invention

According to the embodiment of the present disclosure, the pressure required for the system may be maintained, and the time spent for adjusting the vehicle height may be shortened, thereby stabilizing the vehicle.

DETAILED DESCRIPTION TO EXECUTE THE INVENTION

Hereinafter, an air suspension system according to an embodiment will be described in detail with reference to the FIGS. 1 to 16 of the accompanying drawings using a case of being applied to a vehicle such as a four-wheeled vehicle.

Figure 1:
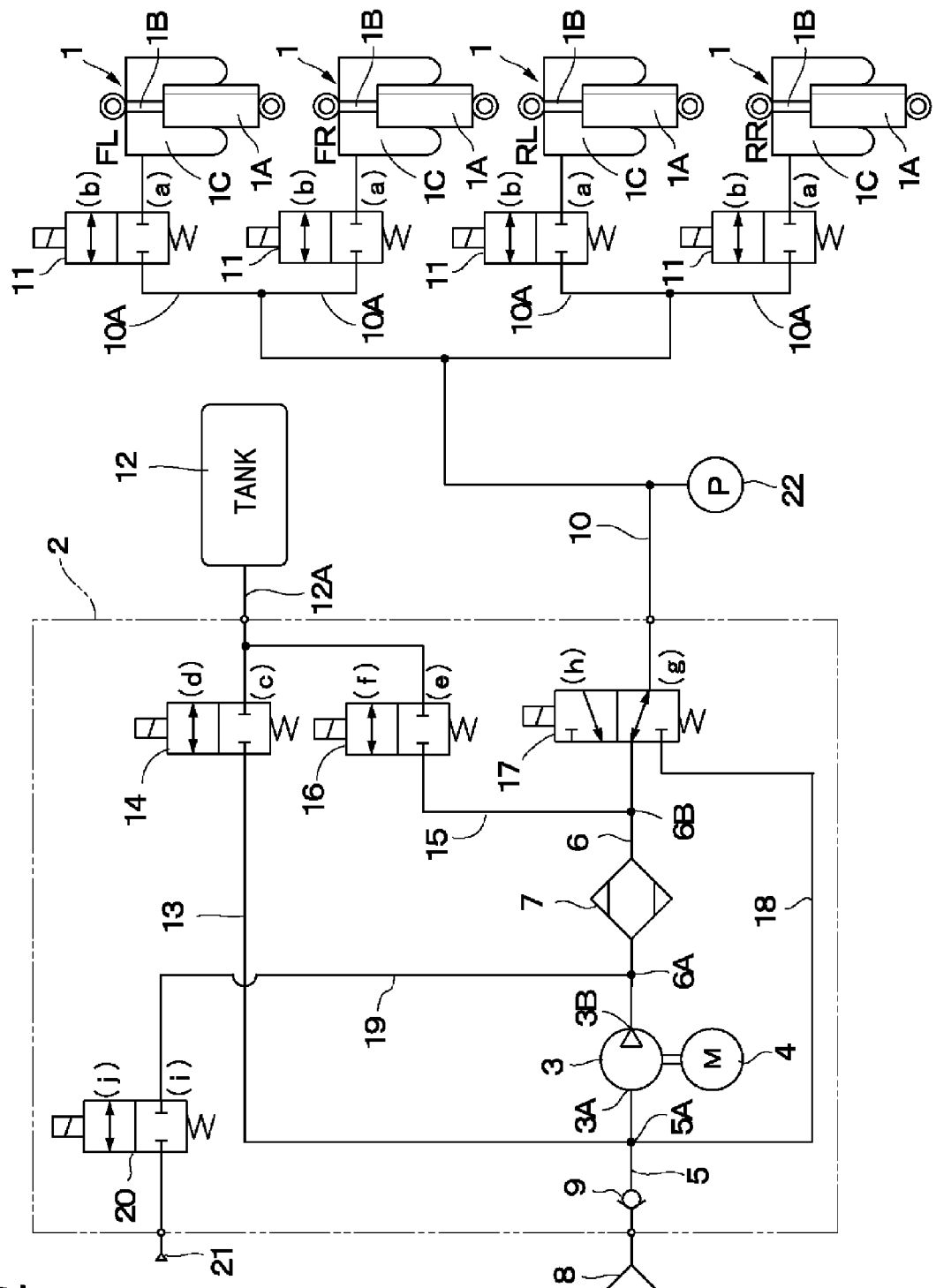
FIG. 1 is a circuit diagram illustrating an overall configuration of an air suspension system according to an embodiment.

In FIG. 1, a total of four air suspensions 1 are provided between each axle side and a vehicle body side of a vehicle (none of which are illustrated) on a front-left wheel (FL) side, a front-right wheel (FR) side, a rear-left wheel (RL) side, and a rear-right wheel (RR) side of the vehicle. The air suspensions 1 adjust a vehicle height according to expansion and extraction of an air chamber 1C by supplying/exhausting compressed air into/from the air chamber 1C (to be described later).

Each air suspension 1 is configured by, for example, a cylinder 1A attached to the axle side of the vehicle, a piston rod 1B protruding extensionally in an axial direction from the inside of the cylinder 1A and attached to the vehicle body side at the protruding end side, and the air chamber 1C that is provided extensionally between the protruding end side of the piston rod 1B and the cylinder 1A and operates as an air spring. The air chamber 1C of each air suspension 1 expands and extracts in the axial direction by supplying/exhausting compressed air from/to a branch pipe 10A (to be described later). At this time, in each air suspension 1, the piston rod 1B extends in the axial direction from the inside of the cylinder 1A and the height of the vehicle (vehicle height) is adjusted according to the supply/exhaust amount of the compressed air.

A compressor device 2 compresses air and supplies the compressed air to the air chamber 1C of the air suspension 1. Here, the compressor device 2 is configured to include, for example, a compressor 3 serving as a compressor body, an electric motor 4 serving as a drive source that drives and stops the compressor 3, an intake pipeline 5 connected to a suction side 3A (hereinafter, referred to as an intake side 3A) of the compressor 3, a supply/exhaust pipeline 6 connected to an ejection side 3B of the compressor 3, an air dryer 7 provided in the supply/exhaust pipeline 6, an intake valve 9 (to be described later), a tank side suction pipeline 13, an intake electromagnetic valve 14, a tank pipeline 15, a return electromagnetic valve 16, a supply/exhaust switching valve 17, a circulation pipeline 18, an exhaust pipeline 19, and an exhaust electromagnetic valve 20.

The compressor 3 serving as a compressor body generates compressed air while sucking air from its intake side 3A. The compressor 3 is configured by, for example, a reciprocating type compressor or a scroll type compressor. The compressed air generated from the compressor 3 is supplied to the air chamber 1C of the air suspension 1, which is a pneumatic device. The compressor 3 is rotatably driven by the electric motor 4 serving as a drive source. The electric motor 4 is controlled to be driven or stopped by a controller 23 (to be described later) (see FIG. 2). The electric motor 4 may use a drive source such as a linear motor.

The intake pipeline 5 is connected to the intake side 3A of the compressor 3. The supply/exhaust pipeline 6 is connected to the ejection side 3B of the compressor 3. One end side of the supply/exhaust pipeline 6 is connected to the ejection side 3B of the compressor 3. The other end side of the supply/exhaust pipeline 6 is connected to an air conduit 10 via the supply/exhaust switching valve 17 (to be described later). The air dryer 7 is provided at an intermediate position of the supply/exhaust pipeline 6.

The intake pipeline 5 of the compressor device 2 constitutes an intake passage of the compressor 3. The tank side suction pipeline 13 and the circulation pipeline 18 (to be described later) are connected with each other at a position of a connection point 5A. The tank side suction pipeline 13 and the circulation pipeline 18 may be separately connected to the intake pipeline 5 before and behind the connection point 5A.

One end side of the intake pipeline 5 is configured as an intake port 8 opened to the outside of the compressor device 2 (compressor 3). The intake port 8 is provided with a filter (not illustrated) that removes, for example, dust in the air. The other end side of the intake pipeline 5 is connected to the intake side 3A of the compressor 3. The intake valve 9 is provided in the middle of the intake pipeline 5. The intake port 8 is a port configured to suck outside air into the intake side 3A when the compressor 3 is driven.

The supply/exhaust pipeline 6 constitutes a supply/exhaust passage that supplies and discharges the compressed air generated from the compressor 3 into/from the air chamber 1C of the air suspension 1. The compressed air supplied to the air chamber 1C of the air suspension 1 is discharged so as to flow back, for example, to the air dryer 7 through the supply/exhaust pipeline 6 from the air chamber 1C when the vehicle height is lowered, or discharged so as to escape to the inside of the tank 12 (to be described later).

Further, the supply/exhaust pipeline 6 is provided with the exhaust pipeline 19 branched from a connection point 6A positioned between the ejection side 3B of the compressor 3 and the air dryer 7. The tank pipeline 15 is provided to be branched from a connection point 6B of the supply/exhaust pipeline 6 positioned between the air dryer 7 and the supply/exhaust switching valve 17. In other words, the air dryer 7 is provided in the supply/exhaust pipeline 6 at the position between the connection points 6A and 6B. The supply/exhaust pipeline 6 may be configured to be provided with a slow return valve (not illustrated) at a position between the air dryer 7 and the connection point 6B.

The air dryer 7 constitutes an air drying unit provided to be interposed in the middle of the supply/exhaust pipeline 6. The air dryer 7 includes, for example, a moisture adsorbent (not illustrated) such as silica gel, and is disposed between the ejection side 3B of the compressor 3 and the supply/exhaust switching valve 17. When the compressed air having a high-pressure generated by the compressor 3 flows forward in the supply/exhaust pipeline 6 toward the air suspension 1 side, the air dryer 7 brings the compressed air into contact with the moisture adsorbent inside to adsorb moisture, and supplies the dried compressed air toward the air chamber 1C of the air suspension 1.

Meanwhile, when the compressed air (exhaust) discharged from the air chamber 1C of the air suspension 1 flows backward in the air dryer 7 (supply/exhaust pipeline 6), since the dried air flows back in the air dryer 7, the dried air desorbs the moisture in the moisture adsorbent in the air dryer 7. Therefore, the moisture adsorbent of the air dryer 7 is regenerated and returned to a state where moisture can be adsorbed again.

The intake valve 9 is provided between the connection point 5A and the intake port 8 in the middle of the intake pipeline 5. The intake valve 9 is a check valve configured to take in air from the atmosphere through the intake port 8. That is, the intake valve 9 including the check valve is opened when the pressure of the intake side 3A of the compressor 3 becomes the atmospheric pressure or less at the position of the connection point 5A, and takes in air from outside (atmosphere) through the intake port 8.

The intake valve 9 functions as a so-called suction valve. The intake valve 9 is constituted by a check valve that allows air to flow toward the inside of the intake pipeline 5 (i.e., the connection point 5A side of the intake pipeline 5) from the intake port 8, and blocks a backward flow. As a result, when the pressure in the intake pipeline 5 (that is, the connection point 5A side of the intake pipeline 5) becomes a pressure (positive pressure) higher than the atmospheric pressure, the intake valve 9 is in a valve-closed state. At this time, the compressed air from the air suspension 1 or the tank 12 is supplied (sucked) to the intake side 3A of the compressor 3 via the tank side suction pipeline 13 and the intake electromagnetic valve 14.

The air chamber 1C of the air suspension 1 is connected to the supply/exhaust pipeline 6 of the compressor 3 via the supply/exhaust switching valve 17 and the air conduit 10. Here, the air conduit 10 is provided with a plurality (e.g., four) of branch pipes 10A branched from each other. Tip end sides of each of the branch pipes 10A are detachably connected to the air chamber 1C of the air suspension 1, respectively.

Supply/exhaust valves 11 for compressed air are provided in the middle of each branch pipe 10A in order to control the supply/exhaust of compressed air to the air chamber 1C of the air suspension 1. A supply/exhaust valve 11 is constituted by, for example, an electromagnetic type switching valve (solenoid valve) having two ports and two positions. The supply/exhaust valve 11 is normally placed at a valve-closed position (a). The supply/exhaust valve 11 is switched from the valve-closed position (a) to a valve-opened position (b) when being excited by a control signal from the controller 23 (to be described later).

Each supply/exhaust valve 11 may be configured to be provided to be connected between the air chamber 1C of the air suspension 1 and the branch pipe 10A. Further, the supply/exhaust valve 11 has a function as a relief valve (safety valve). As a result, when the pressure in the air chamber 1C exceeds a relief set pressure, the supply/exhaust valve 11 is temporarily switched from the valve-closed position (a) to the valve-opened position (b) as a relief valve even while being in a demagnetization state, and the excess pressure at this time may be released into the air conduit 10.

The tank 12 that stores compressed air includes a connection pipe 12A including, for example, a flexible hose. One end portion of the connection pipe 12A is detachably connected to the tank 12, and the other end portion thereof is connected to the tank side suction pipeline 13 and the tank pipeline 15 (to be described later). The connection pipe 12A of the tank 12 is connected to the intake side 3A of the compressor 3 as a first passage via the tank side suction pipeline 13. One end portion of the tank side suction pipeline 13 is connected to the tank 12 (connection pipe 12A), and the other end portion thereof is connected to the intake pipeline 5 at the position of the connection point 5A. That is, the connection point 5A connects the intake pipeline 5 to the tank side suction pipeline 13 such that the tank side suction pipeline 13 is branched from the intake pipeline 5 at the position between the intake side 3A of the compressor 3 and the intake valve 9.

The tank side suction pipeline 13 is provided with the intake electromagnetic valve 14 configured to supply the compressed air in the tank 12 to the intake side 3A of the compressor 3 and stop the supply. The intake electromagnetic valve 14 is constituted by, for example, an electromagnetic type switching valve (solenoid valve) having two ports and two positions. The intake electromagnetic valve 14 is normally placed at a valve-closed position (c). The intake electromagnetic valve 14 is switched from the valve-closed position (c) to a valve-opened position (d) when being excited by a control signal from the controller 23. Further, similar to the supply/exhaust valve 11 described above, the intake electromagnetic valve 14 has a function as a relief valve (safety valve).

The intake electromagnetic valve 14 is an ON/OFF type electromagnetic valve including the valve-closed position (c) and the valve-opened position (d). The intake electromagnetic valve 14 may adopt a highly versatile electromagnetic type switching valve, and, for example, an expensive valve such as a three-way electromagnetic valve may be unnecessary. Similar to the intake electromagnetic valve 14, a highly versatile electromagnetic type switching valve may be adopted for the return electromagnetic valve 16 and the exhaust electromagnetic valve 20.

Further, the connection pipe 12A of the tank 12 is connected to the ejection side 3B of the compressor 3 via the tank pipeline 15 serving as a second passage. One end portion of the tank pipeline 15 is connected to the tank 12 (connection pipe 12A), and the other end portion thereof is connected to the supply/exhaust pipeline 6 to be branched at the position of the connection point 6B. That is, the connection point 6B connects the supply/exhaust pipeline 6 to the tank pipeline 15 such that the tank pipeline 15 is branched from the supply/exhaust pipeline 6 at the position between the air dryer 7 and the supply/exhaust switching valve 17.

The tank pipeline 15 is provided with the return electromagnetic valve 16 serving as a return valve configured to supply so as to return the compressed air in the tank 12 into the supply/exhaust pipeline 6 and stop the supply. The return electromagnetic valve 16 is constituted by, for example, an electromagnetic type switching valve (solenoid valve) having two ports and two positions. The return electromagnetic valve 16 is normally placed at a valve-closed position (e). The return electromagnetic valve 16 is switched from the valve-closed position (e) to a valve-opened position (f) when being excited by a control signal from the controller 23. When the return electromagnetic valve 16 is opened, for example, the compressed air in the air suspension 1 may be accumulated to return to the tank 12 via the tank pipeline 15. Further, similar to the supply/exhaust valve 11 described above, the return electromagnetic valve 16 has a function as a relief valve (safety valve).

The supply/exhaust switching valve 17 is a valve that selectively connects the air conduit 10 of the air suspension 1 side to the supply/exhaust pipeline 6 or the circulation pipeline 18, and is constituted by, for example, an electromagnetic type direction switching valve having three ports and two positions. That is, the supply/exhaust switching valve 17 is selectively switched between a supply/exhaust position (g) at which the compressed air generated by the compressor 3 is supplied to the air chamber 1C of the air suspension 1 or the compressed air in the air chamber 1C is discharged through the supply/exhaust pipeline 6, and a circulation position (h) at which the compressed air in the air chamber 1C is circulated to the intake side 3A of the compressor 3 through the circulation pipeline 18.

The circulation pipeline 18 is a bypass passage provided so as to bypass the compressor 3, the supply/exhaust pipeline 6, and the air dryer 7. One end portion of the circulation pipeline 18 is connectable to the air conduit 10 of the air suspension 1 side via the supply/exhaust switching valve 17. The other end portion of the circulation pipeline 18 is connected to the intake pipeline 5 at the position of the connection point 5A. As a result, when the supply/exhaust switching valve 17 is switched to the circulation position (h), the circulation pipeline 18 circulates the compressed air discharged from the air chamber 1C of the air suspension 1 to the intake side 3A intake side 2A of the compressor 3 so as to bypass the supply/exhaust pipeline 6.

The exhaust pipeline 19 is the second passage configured to exhaust the compressed air in the supply/exhaust pipeline 6 to the outside. The exhaust electromagnetic valve 20 is provided in the middle of the exhaust pipeline 19. One end portion of the exhaust pipeline 19 is connected to the supply/exhaust pipeline 6 at the position of the connection point 6A. The other end portion of the exhaust pipeline 19 extends to the outside of the compressor device 2, and a tip end portion thereof is configured as an exhaust port 21.

The exhaust electromagnetic valve 20 as an exhaust valve is provided in the exhaust pipeline 19 as the second passage. The exhaust electromagnetic valve 20 is constituted by, for example, an electromagnetic type switching valve (solenoid valve) having two ports and two positions. The exhaust electromagnetic valve 20 is normally placed at a valve-closed position (i). The exhaust electromagnetic valve 20 is switched from the valve-closed position (i) to a valve-opened position (j) when being excited by a control signal from the controller 23. When the exhaust electromagnetic valve 20 is opened, the compressed air in the tank 12 may be exhausted (opened) to the outside from the exhaust port 21 through the supply/exhaust pipeline 6, the air dryer 7, and the exhaust pipeline 19, or the compressed air in the air suspension 1 may be exhausted (opened) to the outside from the exhaust port 21 through the supply/exhaust pipeline 6, the air dryer 7, and the exhaust pipeline 19. Further, similar to the supply/exhaust valve 11 described above, the exhaust electromagnetic valve 20 has a function as a relief valve (safety valve).

Further, the air conduit 10 is provided with a pressure detector 22 at a position, for example, between each branch pipe 10A and the supply/exhaust switching valve 17. The pressure detector 22 detects the pressure in the tank 12 via the tank pipeline 15, for example, when the return electromagnetic valve 16 is switched from the valve-closed position (e) to the valve-opened position (f), in a state where all the supply/exhaust valves 11, the intake electromagnetic valve 14, and the exhaust electromagnetic valve 20 are closed and the supply/exhaust switching valve 17 is returned to the supply/exhaust position (g). Further, for example, when at least one of the supply/exhaust valves 11 is opened in a state where the intake electromagnetic valve 14, the return electromagnetic valve 16, and the exhaust electromagnetic valve 20 are closed, the pressure in the air chamber 1C of the corresponding air suspension 1 may be detected by the pressure detector 22.

The controller 23 as a control device is constituted by, for example, a micro computer. An input side of the controller 23 is connected to, for example, the pressure detector 22, a plurality of vehicle height sensors 24 (i.e., FL side, FR side, RL side, and RR side vehicle height sensors 24), and a selection switch 25. The FL side, FR side, RL side, and RR side vehicle height sensors 24 are vehicle height detecting units configured to individually detect the vehicle height according to each air suspension 1 on the front-left wheel (FL), the front-right wheel (FR), the rear-left wheel (RL), and the rear-right wheel (RR) sides of the vehicle. The selection switch 25 is an operation switch that switches, for example, when adjusting the vehicle height, between an automatic mode and a selection mode in which a driver arbitrarily changes the vehicle height according to his/her preference.

Here, when the selection switch 25 is operated to select to perform the vehicle height adjustment in the automatic mode, the controller 23 compares (determines) whether each air suspension 1 is higher or lower than a set height, which is a target vehicle height, based on vehicle height detection signals output from the FL side, FR side, RL side, and RR side vehicle height sensors 24. Thereafter, the controller 23 individually performs the vehicle height adjustment by each air suspension 1 on the front-left wheel (FL), the front-right wheel (FR), the rear-left wheel (RL), and the rear-right wheel (RR) sides, based on the comparison (determination) results.

An output side of the controller 23 is connected to, for example, the electric motor 4 of the compressor 3, the supply/exhaust valves 11 on the FL side, FR side, RL side, and RR side, the intake electromagnetic valve 14, the return electromagnetic valve 16, the supply/exhaust switching valve 17, and the exhaust electromagnetic valve 20. Further, the controller 23 is connected to another controller 26 via, for example, controller area network (CAN), which is a network required for data communication. Therefore, the controller 23 may be input or output various vehicle information including, for example, outside temperature (ambient temperature), data and time information, and load information such as load weight with another controller 26.

Further, the controller 23 includes a memory 23A including, for example, a ROM, a RAM, and a non-volatile memory. In the memory 23A, for example, a vehicle height adjustment processing program (including a vehicle height adjustment processing program illustrated in FIG. 16) including vehicle height raising and lowering control, and control maps for setting a target pressure illustrated in FIGS. 10 to 15, and a calculation map (not illustrated) of a temperature threshold value Tx based on a tank pressure Pt are stored to be updatable. The calculation map is a map for obtaining a predetermined exhaust value from the pressure and the temperature of the tank 12, and determining whether or not to regenerate the air dryer 7 in consideration of the predetermined exhaust value.

The controller 23 performs drive control of the electric motor 4 based on signals from, for example, each vehicle height sensor 24 and the selection switch 25. At the same time, the controller 23 outputs control signals to, for example, each supply/exhaust valve 11, the intake electromagnetic valve 14, the return electromagnetic valve 16, the supply/exhaust switching valve 17, and the exhaust electromagnetic valve 20 to individually excite or demagnetize these valves 11, 14, 16, 17, and 20 (specifically, each solenoid). Therefore, the supply/exhaust valve 11 is switched to one of the valve-closed position (a) and the valve-opened position (b) illustrated, and the intake electromagnetic valve 14, the return electromagnetic valve 16, the supply/exhaust switching valve 17, and the exhaust electromagnetic valve 20 are also switched to any one position, respectively.

The air suspension system according to the embodiment has the configuration as described above, and descriptions will be made on the operation thereof using a case in which the selection switch 25 is operated to perform the vehicle height adjustment in the automatic mode as an example.

Figure 3:
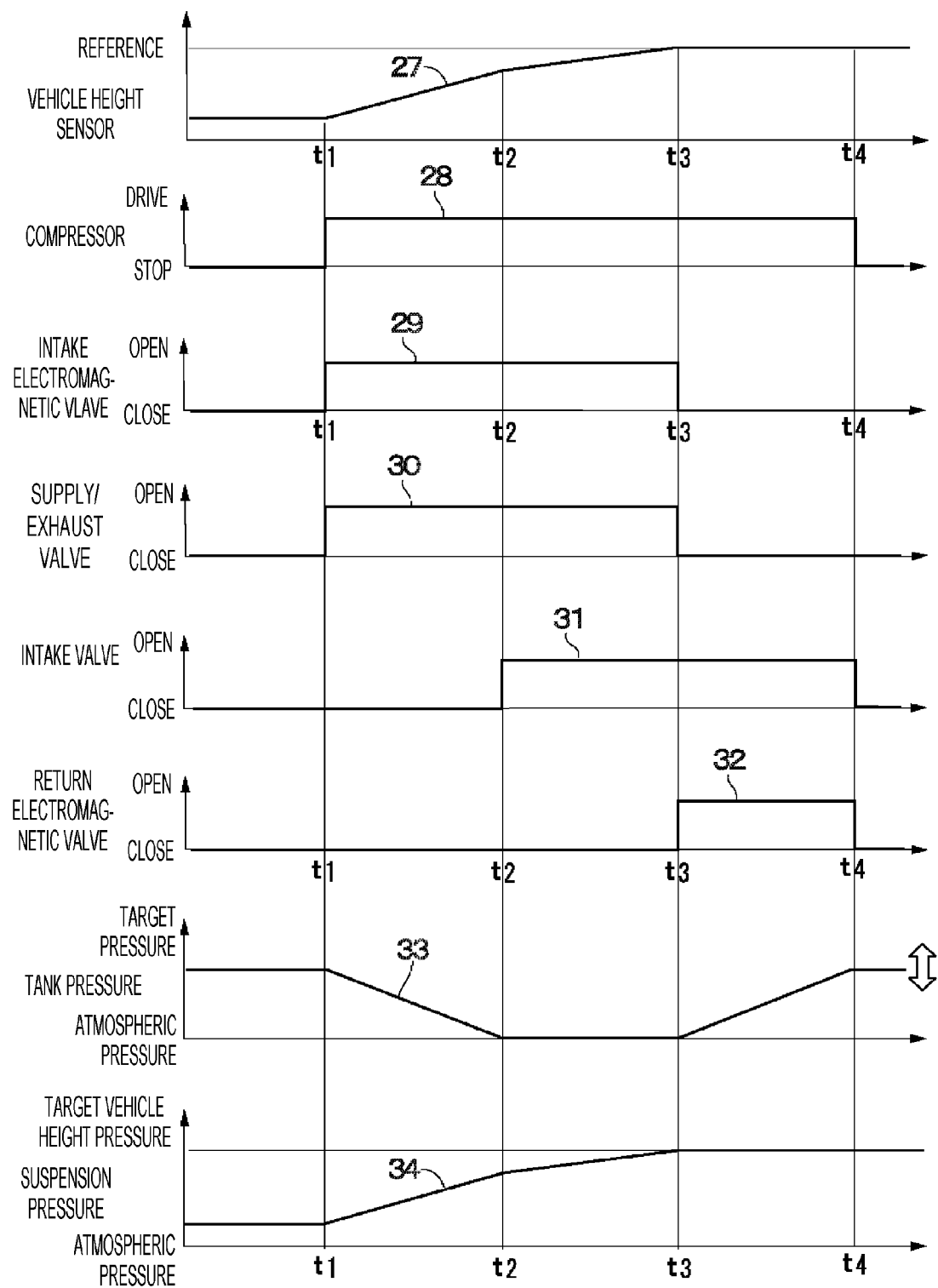
FIG. 3 is a time chart view illustrating a valve control and the like when a vehicle height is raised to a reference height by the controller.

For example, as illustrated in a characteristic line 27 illustrated in FIG. 3, after a vehicle engine is started (operated), the vehicle height of the vehicle according to the detection signal from the vehicle height sensor 24 may be lower than the reference height (reference height set in the automatic mode by the selection switch 25). As a reason for this, it is considered that, for example, compressed air is leaked (leakage) to the outside from, for example, the air chamber 1C of the air suspension 1 or a seal part of the air conduit 10, and the vehicle height becomes lower than the reference height (reference vehicle height).

In this case, the controller 23 of the air suspension system drives the compressor 3 by the electric motor 4 of the compressor device 2 as illustrated in a characteristic line 28 during the time t1 to t4 after the ignition (starting switch) of the vehicle is turned on. At this time, the intake electromagnetic valve 14 is opened during the time t1 to t3 as illustrated in a characteristic line 29, and the supply/exhaust valve 11 on each air suspension 1 side is also opened during the time t1 to t3 as illustrated in a characteristic line 30.

Figure 4:
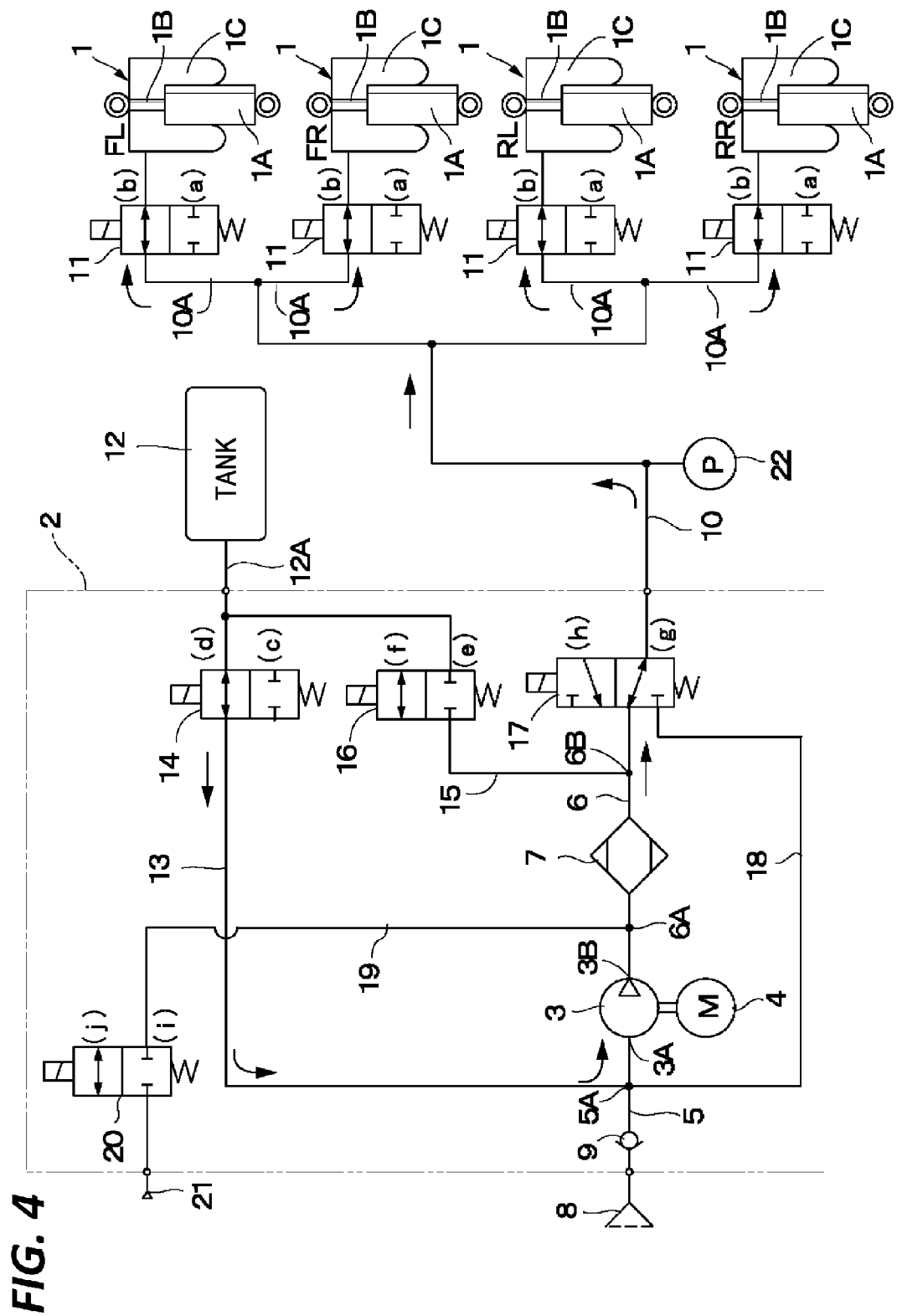
FIG. 4 is a circuit diagram of the air suspension system illustrating a control state where compressed air is sucked from a tank to raise the vehicle height.

FIG. 4 illustrates a circuit configuration when the vehicle height is raised to the target vehicle height (set height) as described above. That is, the compressor 3 is driven by the electric motor 4, and the intake electromagnetic valve 14 is switched from the valve-closed position (c) to the valve-opened position (d). Therefore, as illustrated by an arrow in FIG. 4, the compressed air in the tank 12 is ejected from the ejection side 3B to the supply/exhaust pipeline 6 toward the air dryer 7 while being sucked to the intake side 3A via the tank side suction pipeline 13, the connection point 5A, and the intake pipeline 5.

Further, the supply/exhaust valve 11 of the air suspension 1 is switched from the valve-closed position (a) to the valve-opened position (b). Therefore, compressed air is supplied from the ejection side 3B of the compressor 3 to the air chamber 1C of the air suspension 1 via the air dryer 7 and the supply/exhaust switching valve 17, and the vehicle height may be driven in the raising direction. As described above, when the vehicle height is raised, the air compressed by the compressor 3 is dried by passing through the air dryer 7, and the compressed air in the dried state is supplied into the air chamber 1C of the air suspension 1.

In this case, the compressor 3 sucks the compressed air in the tank 12 into the intake side 3A. As a result, for example, as illustrated by a characteristic line 33, the pressure (tank pressure) in the tank 12 is gradually decreased after the time t1. For example, when the tank pressure is reduced to the atmospheric pressure at the time t2, the intake valve 9 (check valve) is opened as illustrated in a characteristic line 31. That is, the intake valve 9 is set to be opened, for example, when the connection point 5A side becomes the atmospheric pressure or less, and thus, the compressor 3 may suck air to be compressed from the intake port 8 to secure a required amount of sucked air.

Figure 5:
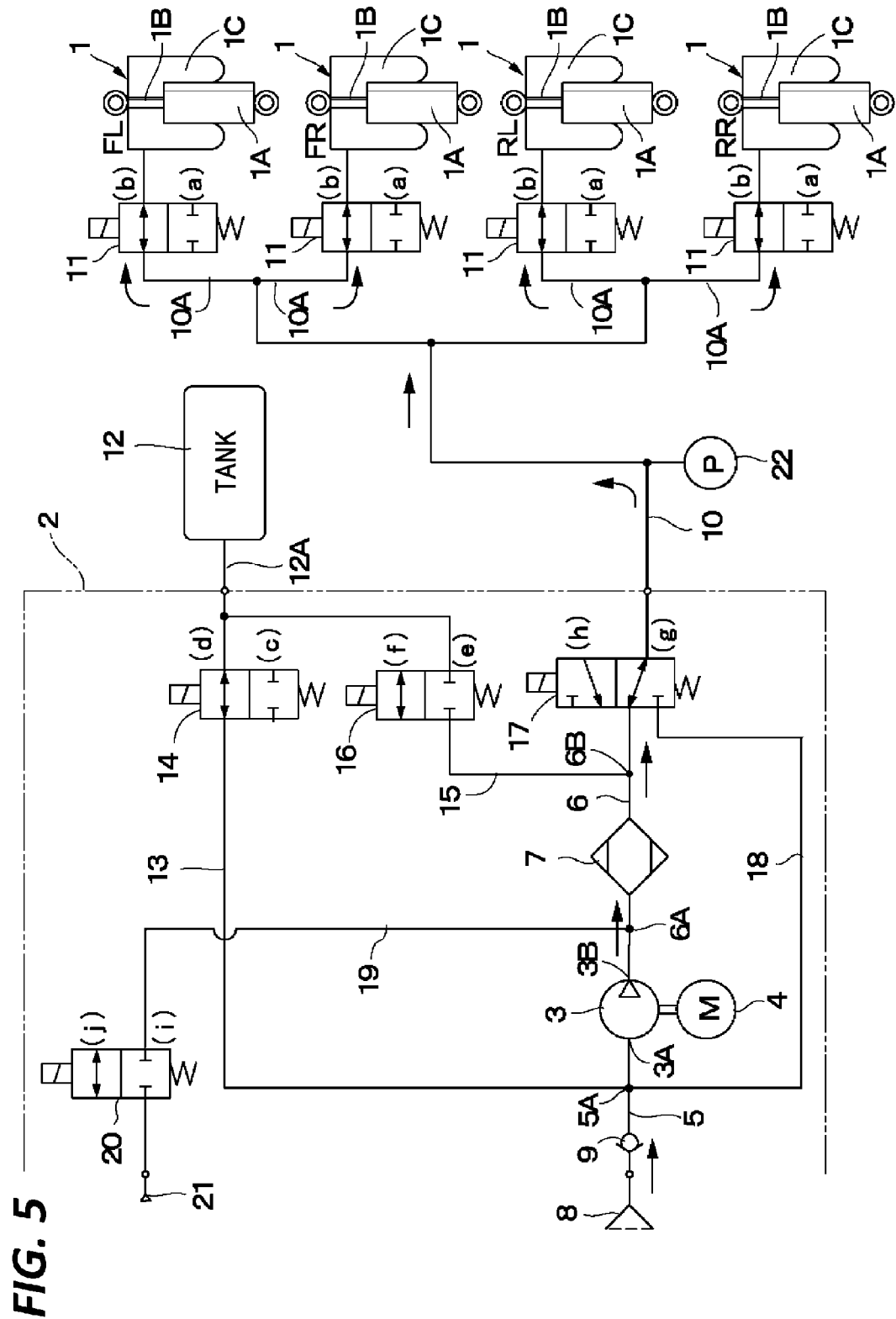
FIG. 5 is a circuit diagram of the air suspension system illustrating a control state where outside air is sucked to generate compressed air to raise the vehicle height.

FIG. 5 illustrates the circuit configuration when compressed air generated by the compressor 3 by sucking outside air from the intake port 8 is supplied into the air chamber 1C of the air suspension 1 to raise the vehicle height to the target vehicle height (set height). That is, by driving the compressor 3 by the electric motor 4, as illustrated by an arrow in FIG. 5, outside air is sucked from the intake port 8 to the intake side 3A via the intake pipeline 5 and is ejected from the ejection side 3B to the supply/exhaust pipeline 6 toward the air dryer 7, and the compressed air dried by the air dryer 7 is supplied into the air chamber 1C of the air suspension 1.

As a result, during the time t2 to t3, the compressor 3 may supply compressed air to the air chamber 1C of the air suspension 1 via the supply/exhaust pipeline 6, the air dryer 7, and the supply/exhaust switching valve 17 while taking in air from outside air through the intake port 8 and the intake pipeline 5. Therefore, the suspension pressure is raised to the reference vehicle height pressure at the time t3 as illustrated in a characteristic line 34. Further, also according to the detection signal from the vehicle height sensor 24, the vehicle height reaches the reference height at the time t3 as illustrated in the characteristic line 27.

Therefore, the controller 23 closes the intake electromagnetic valve 14 (see characteristic line 29) and also closes the supply/exhaust valve 11 (see characteristic line 30) in the same manner at the state where the vehicle height reaches the target vehicle height (at time t3). Therefore, further supply of compressed air to the air chamber 1C of the air suspension 1 is stopped, and thus, the raising (adjustment) of the vehicle height by the air suspension 1 is stopped.

Figure 6:
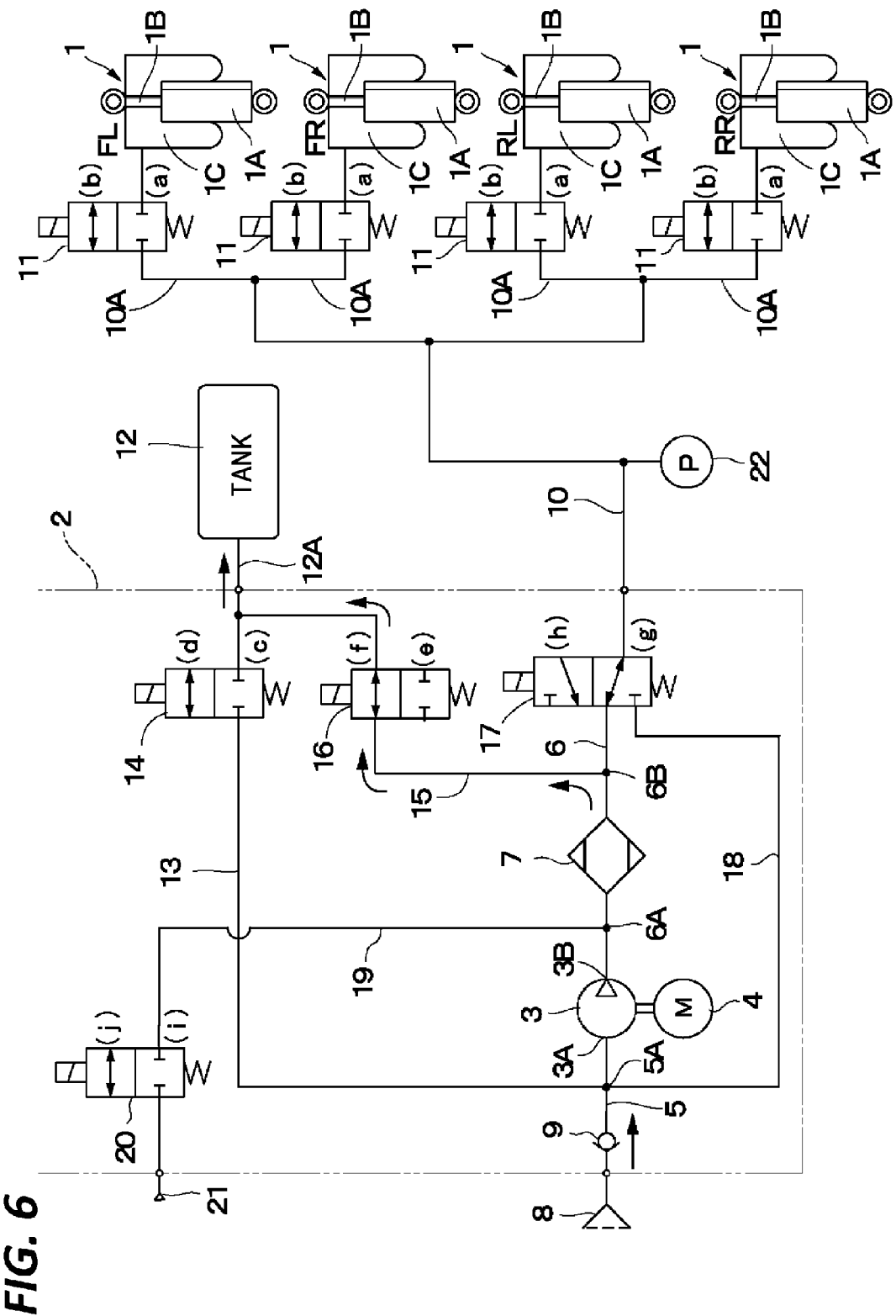
FIG. 6 is a circuit diagram of the air suspension system illustrating a state where outside air is sucked and compressed air is accumulated in the tank.

Meanwhile, the controller 23 opens the return electromagnetic valve 16 during the time t3 to t4 as illustrated in a characteristic line 32. As a result, as illustrated in FIG. 6, the compressed air compressed by the compressor 3 is filled and accumulated in the tank 12 via the supply/exhaust pipeline 6, the air dryer 7, the tank pipeline 15, and the return electromagnetic valve 16. During the time t3 to t4, the compressed air is supplied into the tank 12, instead of the air chamber 1C of the air suspension 1. In the state illustrated in FIG. 6, the supply/exhaust valve 11 is closed, and the return electromagnetic valve 16 is opened. As a result, the tank pressure in the tank 12 may be detected by the pressure detector 22.

As illustrated in the characteristic line 33, the pressure (tank pressure) in the tank 12 is raised to the target pressure, for example, at time t4, the compressor 3 is stopped as illustrated in the characteristic line 28, and the return electromagnetic valve 16 is closed as illustrated in the characteristic line 32. The intake valve 9 is automatically closed according to the stop of the compressor 3. Therefore, when the pressure in the tank 12 is reduced below a predetermined pressure (e.g., target pressure) after air is supplied to the air suspension 1, the compressed air from the compressor 3 may be supplied into the tank 12, and the pressure in the tank 12 may be raised to the target pressure.

Figure 10:
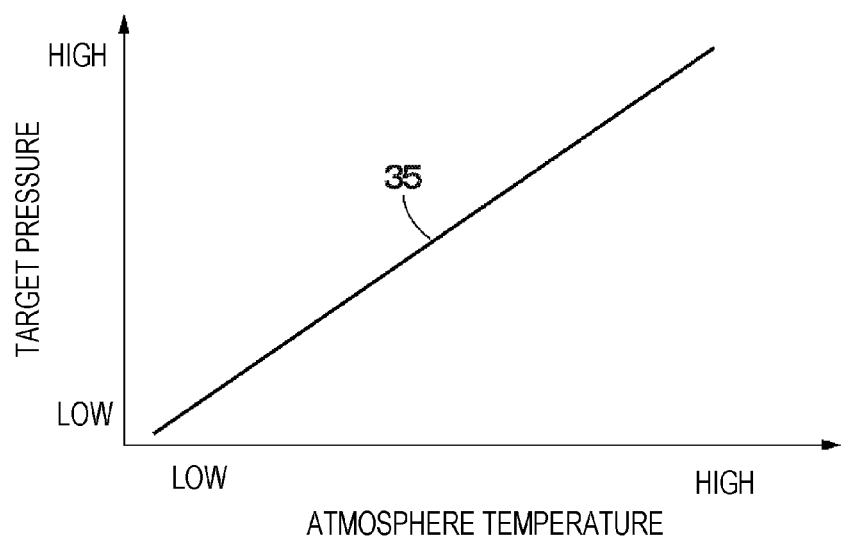
FIG. 10 is a characteristic diagram illustrating a relationship between a target pressure of compressed air accumulated in the tank and an ambient atmosphere temperature.

Here, the target pressure of the compressed air accumulated in the tank 12 is variably set according to the ambient atmosphere temperature (outside air temperature), for example, as illustrated in a characteristic line 35 illustrated in FIG. 10. In this case, the atmosphere temperature (outside air temperature) may be detected as vehicle information from another controller 26 illustrated in FIG. 2. In the characteristic line 35, when the atmosphere temperature is low, the target pressure is also set to a low pressure in proportion to the temperature, and the target pressure is set to be proportionally increased as the atmosphere temperature increases.

That is, since the pressure of the compressed air stored in the tank 12 increases or decreases according to the outside air temperature, the target pressure of the tank 12 is variably set as illustrated in the characteristic line 35 illustrated in FIG. 10, and thus, the amount (weight) of the compressed air in the tank 12 may be kept substantially constant without being affected by the outside air temperature. As a result, at the time of subsequent vehicle height adjustment, compressed air may be stored in the state where the target pressure is secured in the tank 12.

For example, also after the initial vehicle height adjustment after the vehicle engine is started, the load weight may increase by luggage or occupants and the vehicle height may be lowered before the vehicle starts traveling on the road. Also in this case, for example, as illustrated in FIG. 4, the compressor 3 may take in compressed air from the tank 12 and quickly supply the compressed air having a higher pressure to the air suspension 1. Therefore, the time required to raise the vehicle height to the reference height may be shortened and workability at the time of the vehicle height adjustment may be improved.

Figure 11:
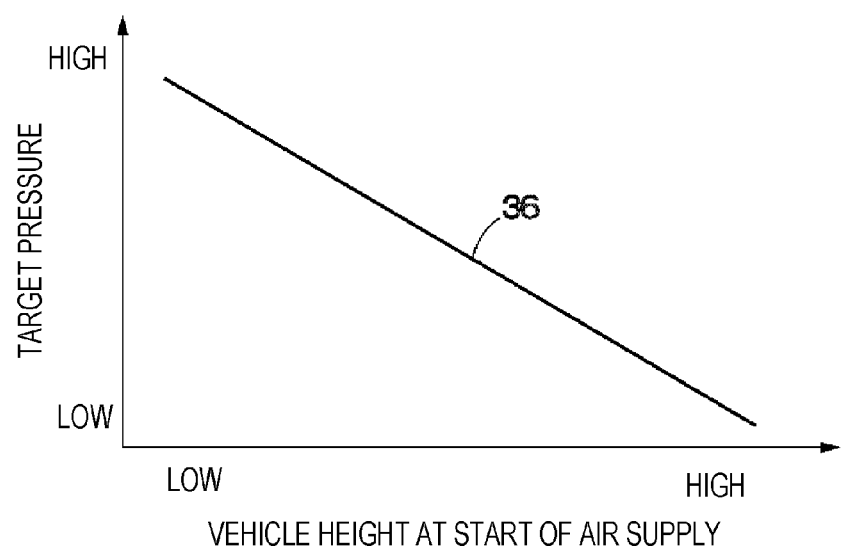
FIG. 11 is a characteristic diagram illustrating a relationship between a vehicle height at start of air supply to an air suspension and a target pressure of the tank.

Next, a characteristic line 36 illustrated in FIG. 11 illustrates a relationship between the vehicle height at the time of start of air supply to the air suspension 1 and the target pressure of the tank 12. When the vehicle height at the time of start of air supply (e.g., immediately after the engine start) is low, it may be presumed to be a case in which compressed air is leaked slightly by any chance from, for example, the air chamber 1C of the air suspension 1, and thus, the vehicle height is lowered. Meanwhile, when the vehicle height at the time of start of air supply is high (e.g., the vehicle height is close to the reference height immediately after the engine start), it may be presumed to be a case in which compressed air is hardly leaked from, for example, the air chamber 1C of the air suspension 1.

Therefore, in the characteristic line 36, when the vehicle height at the time of start of air supply is high, it is the case in which the air is hardly leaked, and even when the target pressure of the compressed air stored in the tank 12 is lowered, the time required to raise the vehicle height to the reference height may be shortened, and workability at the time of the vehicle height adjustment may be improved. Meanwhile, when the vehicle height at the time of start of air supply is low, since the air leakage has occurred, in the characteristic line 36, the target pressure of the compressed air stored in the tank 12 is set high. Therefore, before traveling on the road, the time required to raise the vehicle height to the reference height may be shortened and workability at the time of the vehicle height adjustment may be improved.

Figure 12:
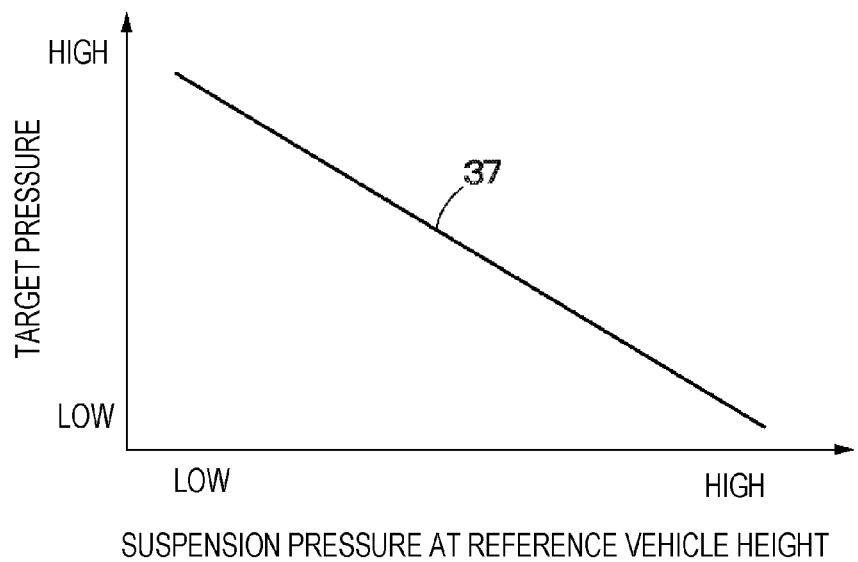
FIG. 12 is a characteristic diagram illustrating a relationship between a suspension pressure at a reference vehicle height and a target pressure of the tank.

Next, a characteristic line 37 illustrated in FIG. 12 illustrates a relationship between the suspension pressure at the reference vehicle height and the target pressure of the tank 12. When the pressure (suspension pressure) in the air chamber 1C of the air suspension 1 is relatively high at the time of end of the reference vehicle height adjustment, it may be determined that a spring load is heavy. In this case, the compressed air in the tank 12 is already supplied to the air chamber 1C of each air suspension 1, and in the future, it is unlikely that the compressed air in the tank 12 will be used to raise the vehicle height.

As a result, in the characteristic line 37 illustrated in FIG. 12, when the suspension pressure at the reference vehicle height is high, the target pressure of the compressed air stored in the tank 12 is set low. Meanwhile, when the suspension pressure at the reference vehicle height is low, the target pressure of the tank 12 is set high. Therefore, when the spring load (load weight of the vehicle) is increased after the end of the reference vehicle height adjustment, in order to quickly deal with before traveling on the road, the vehicle height may be raised to the reference height early by generating compressed air having a high pressure while taking in the compressed air in the tank 12 to the compressor 3, and thus, workability at the time of the vehicle height adjustment may be improved.

Figure 13:
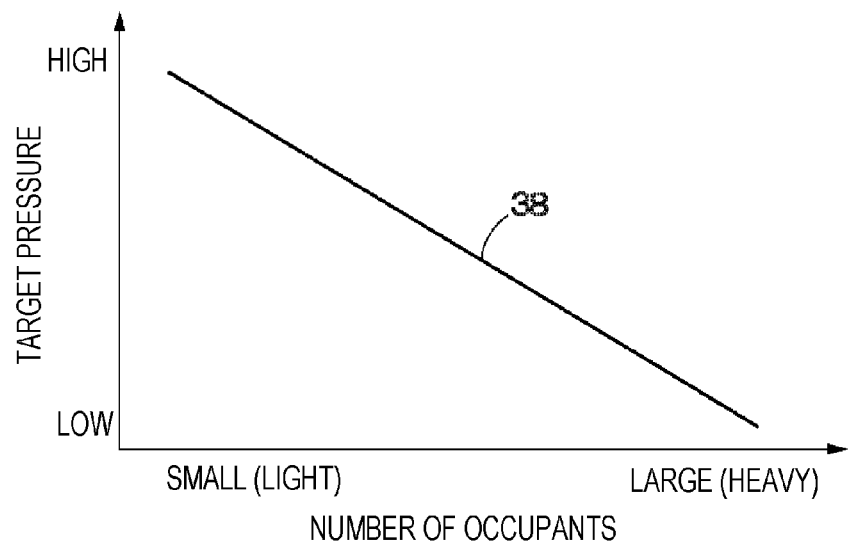
FIG. 13 is a characteristic diagram illustrating a relationship between the number of occupants in a vehicle and a target pressure of the tank.

Next, a characteristic line 38 illustrated in FIG. 13 illustrates a relationship between the number of occupants in the vehicle and the target pressure of the tank 12. The number of occupants in the vehicle may be detected by a seat belt sensor or a seat pressure sensor (not illustrated) provided on a seat side of the vehicle. Therefore, when it is determined that the number of occupants is large, it is determined that the spring load is heavy, and thus, the compressed air in the tank 12 is already supplied to the air chamber 1C of each air suspension 1, and in the future, it is unlikely that the compressed air in the tank 12 will be used to raise the vehicle height.

As a result, in the characteristic line 38 illustrated in FIG. 13, when the number of occupants is large (heavy), the target pressure of the compressed air stored in the tank 12 is set low. Meanwhile, when the number of occupants is small (light), the target pressure of the tank 12 is set high, and when the number of occupants increases later, by quickly dealing with before traveling on the road, the time required to raise the vehicle height to the reference height is shortened and workability at the time of the vehicle height adjustment may be improved.

Figure 14:
FIG. 14 is a characteristic diagram illustrating a relationship between a set vehicle height by a selection switch and a target pressure of the tank.

Next, in a characteristic line 39 illustrated in FIG. 14, for example, when a vehicle driver operates the selection switch 25 to set the set vehicle height to be high, the target pressure of the compressed air stored in the tank 12 is set low, and the target pressure may be set high in the opposite case. That is, when the driver selects the vehicle height higher than the normal reference vehicle height, the compressed air in the tank 12 is already supplied to the air chamber 1C of each air suspension 1, and thus, in the future, it is unlikely that the compressed air in the tank 12 will be used to additionally raise (additional vehicle height raising) the vehicle height. Therefore, in this case, the target pressure of the tank 12 is set low as illustrated in the characteristic line 39.

Meanwhile, when the driver selects the set vehicle height lower than the normal reference vehicle height, the target pressure of the compressed air in the tank 12 is set high as illustrated in the characteristic line 39. Therefore, at the time of the vehicle height adjustment later, in order to quickly deal with before traveling on the road, the vehicle height may be raised early by generating compressed air having a high pressure while taking in the compressed air in the tank 12 to the compressor 3, and thus, workability at the time of the vehicle height adjustment may be improved. When it is possible for the driver to select the set vehicle height in multiple stages, it may be configured to switch the target pressure in multiple stages depending on the difference from the reference vehicle height.

Figure 15:
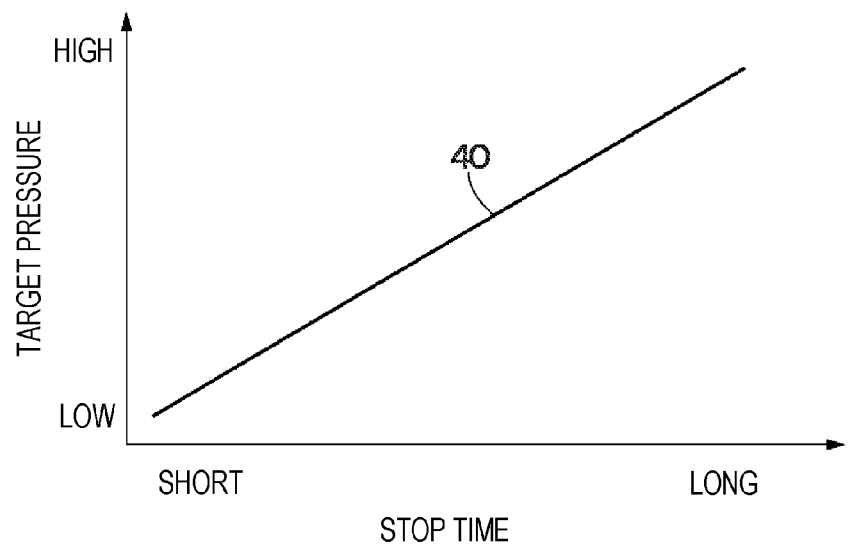
FIG. 15 is a characteristic diagram illustrating a relationship between a stop time and a target pressure of the tank.

Next, a characteristic line 40 illustrated in FIG. 15 illustrates a relationship between the stop (parking) time of the vehicle and the target pressure of the tank 12. When an elapsed time (i.e., absolute time information, which is the stop time of the vehicle) from a previous driving to a next driving is long, it is likely that compressed air is leaked from, for example, the air chamber 1C of the air suspension 1. Meanwhile, when an elapsed time (i.e., absolute time information, which is the stop time of the vehicle) from a previous driving to a next driving is short, it is unlikely that compressed air is leaked from, for example, the air chamber 1C of the air suspension 1.

Therefore, as illustrated in the characteristic line 40 illustrated in FIG. 15, the target pressure of the compressed air stored in the tank 12 is set to a relationship that is proportional to the stop (parking) time of the vehicle. Therefore, the target pressure of the compressed air stored in the tank 12 may be variably set corresponding to the absolute time information of the vehicle stop, and thus, the compressed air in the tank 12 is used to quickly deal with before traveling on the road, and workability at the time of the vehicle height adjustment may be improved. In this case, when the absolute time information (e.g., stop time of the vehicle) is a predetermined value (e.g., half a month to a month) or larger, as illustrated in the control illustrated in FIG. 4, after air is supplied from the tank 12 to the air suspension 1, the compressor 3 may be operated to increase the pressure of the tank 12, and the target pressure at this time may be set based on the characteristic line 40 illustrated in FIG. 15.

Therefore, the controller 23 may selectively set the target pressure of the tank 12, for example, based on any one of the characteristic lines among the characteristic lines 35 to 40 illustrated in FIGS. 10 to 15. Then, according to the target pressure set in this manner, for example, as illustrated in the characteristic line 33 illustrated in FIG. 3, the pressure (tank pressure) in the tank 12 may be variably controlled.

Next, control when the vehicle height is lowered will be described with reference to FIGS. 7 to 10.

Figure 7:
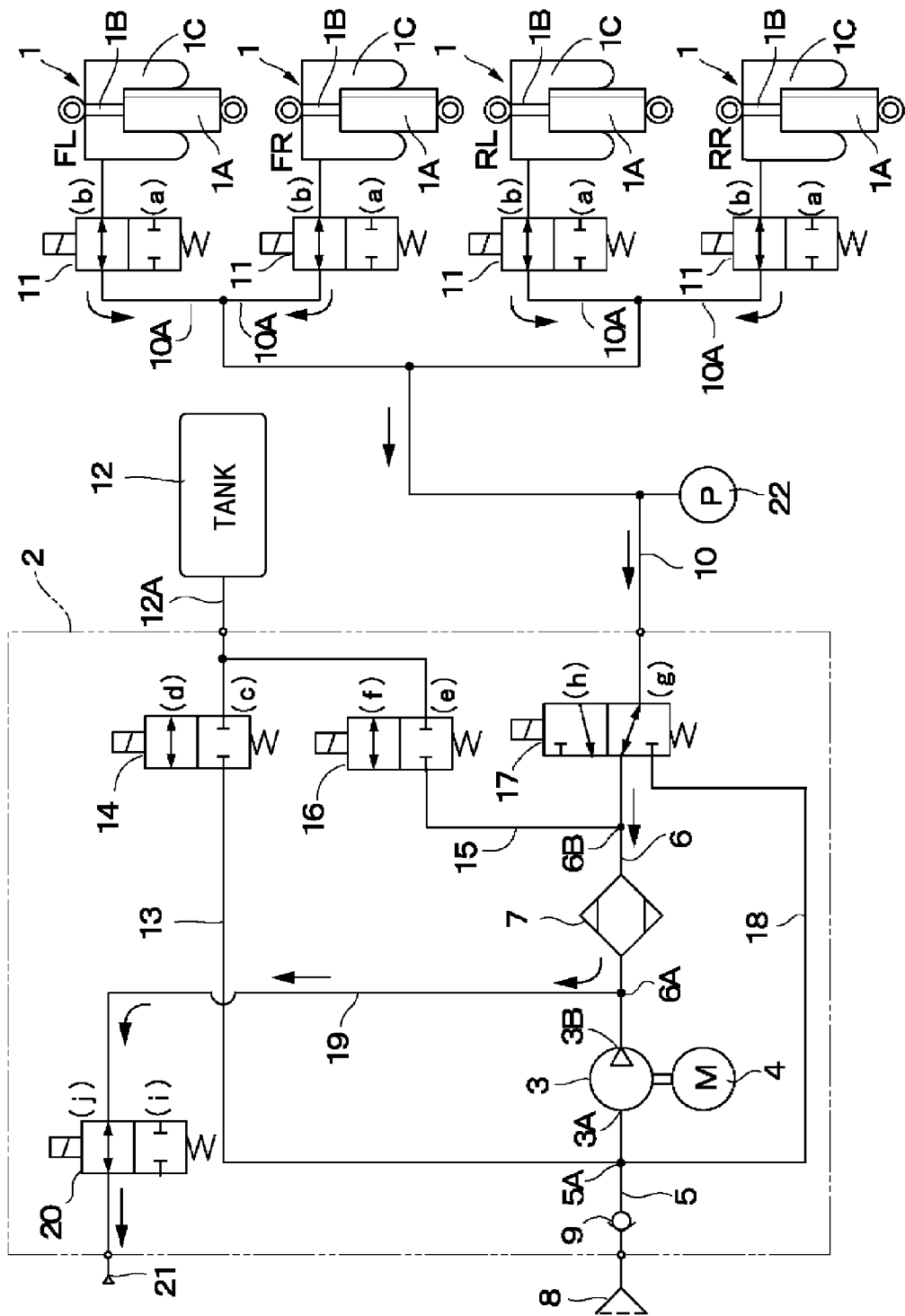
FIG. 7 is a circuit diagram of the air suspension system illustrating a state where compressed air is released to an outside from an air suspension to lower the vehicle height.

FIG. 7 illustrates a case in which compressed air is directly discharged from the air chamber 1C of the air suspension 1 to outside air via the supply/exhaust pipeline 6, the exhaust pipeline 19, and the exhaust electromagnetic valve 20. In this case, in order to exhaust from the air suspension 1, the supply/exhaust valve 11 of the air suspension 1 is switched from the valve-closed position (a) to the valve-opened position (b), and the supply/exhaust switching valve 17 is placed at the supply/exhaust position (g), and after that, the exhaust electromagnetic valve 20 is controlled to be switched from the valve-closed position (i) to the valve-opened position (j). Therefore, from the air chamber 1C of the air suspension 1, compressed air is directly discharged (released) from the exhaust port 21 to outside air via the supply/exhaust pipeline 6, the air dryer 7, the exhaust pipeline 19, and the exhaust electromagnetic valve 20.

As a result, the air chamber 1C of the air suspension 1 may be reduced and the vehicle height lowering speed at the time of lowering the vehicle height may be increased. Further, since the compressed air discharged from the air suspension 1 (air chamber 1C) at this time flows back in the air dryer 7 through the supply/exhaust pipeline 6, the moisture adsorbent in the air dryer 7 is regenerated by passing the dried air of the air suspension 1, and the air dryer 7 may be efficiently regenerated.

Figure 8:
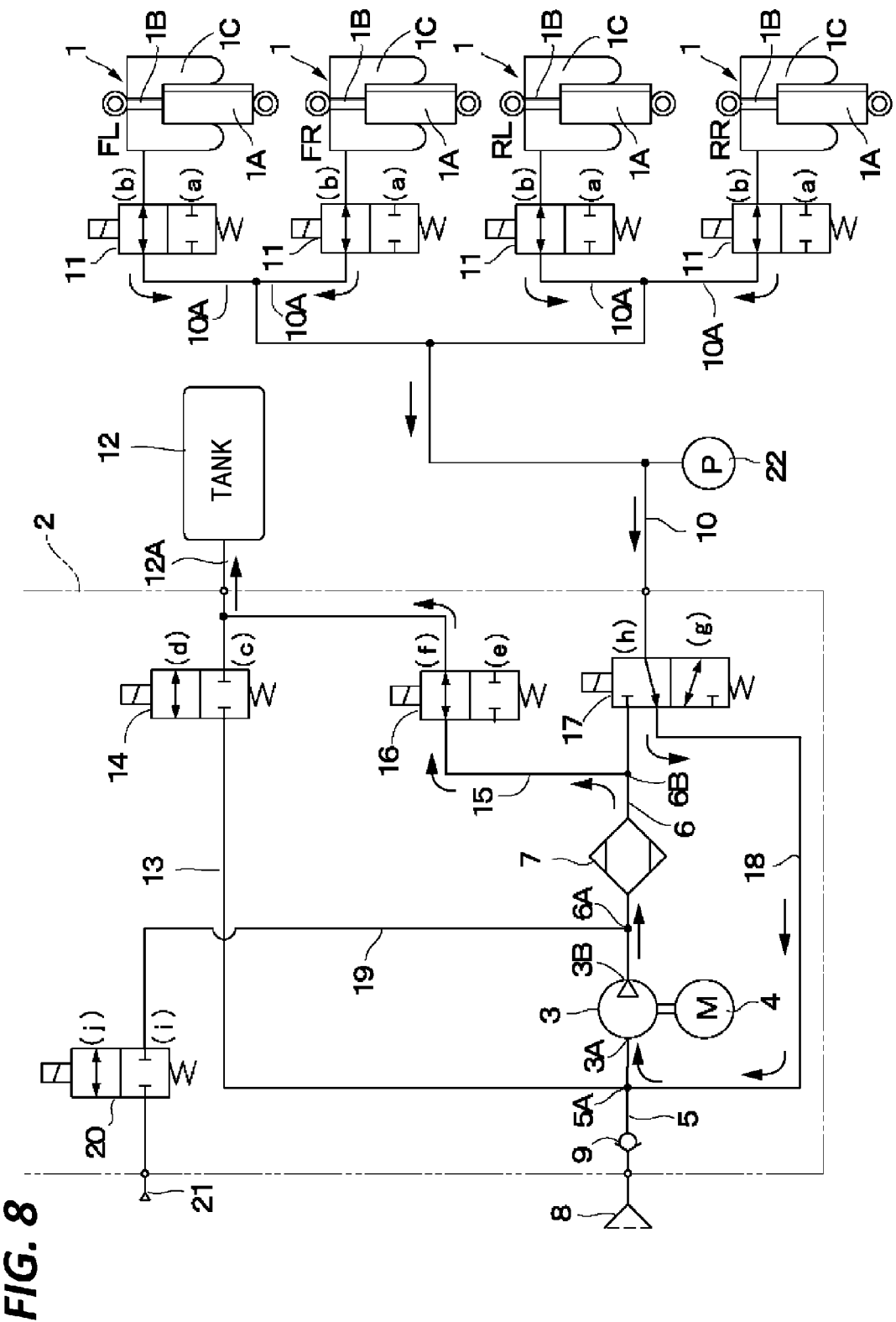
FIG. 8 is a circuit diagram of the air suspension system illustrating a state where compressed air is discharged from the air suspension toward the tank to be accumulated to lower the vehicle height.

FIG. 8 illustrates a case in which compressed air is exhausted toward the tank 12 from the air chamber 1C of the air suspension 1. In this case, in order to exhaust from the air suspension 1, the supply/exhaust valve 11 of the air suspension 1 is switched from the valve-closed position (a) to the valve-opened position (b), and the supply/exhaust switching valve 17 is switched from the supply/exhaust position (g) to the circulation position (h). Thereafter, the compressor 3 is driven by the electric motor 4, and the return electromagnetic valve 16 is controlled to be switched from the valve-closed position (e) to the valve-opened position (f).

Therefore, compressed air is sucked from the air chamber 1C of the air suspension 1 to the intake side 3A of the compressor 3 via the supply/exhaust switching valve 17 and the circulation pipeline 18, and is filled (discharged) to escape 12 from the ejection side 3B of the compressor 3 to the tank via the air dryer 7, the supply/exhaust pipeline 6, the tank pipeline 15, and the return electromagnetic valve 16. As a result, the vehicle height may be lowered in a state where the compressed air in the air suspension 1 is stored in the tank 12, and the compressed air (i.e., compressed air compressed by the compressor 3 and dried by the air dryer 7) in the air suspension system may be effectively used for the subsequent vehicle height adjustment without wasting to the outside.

Figure 9:
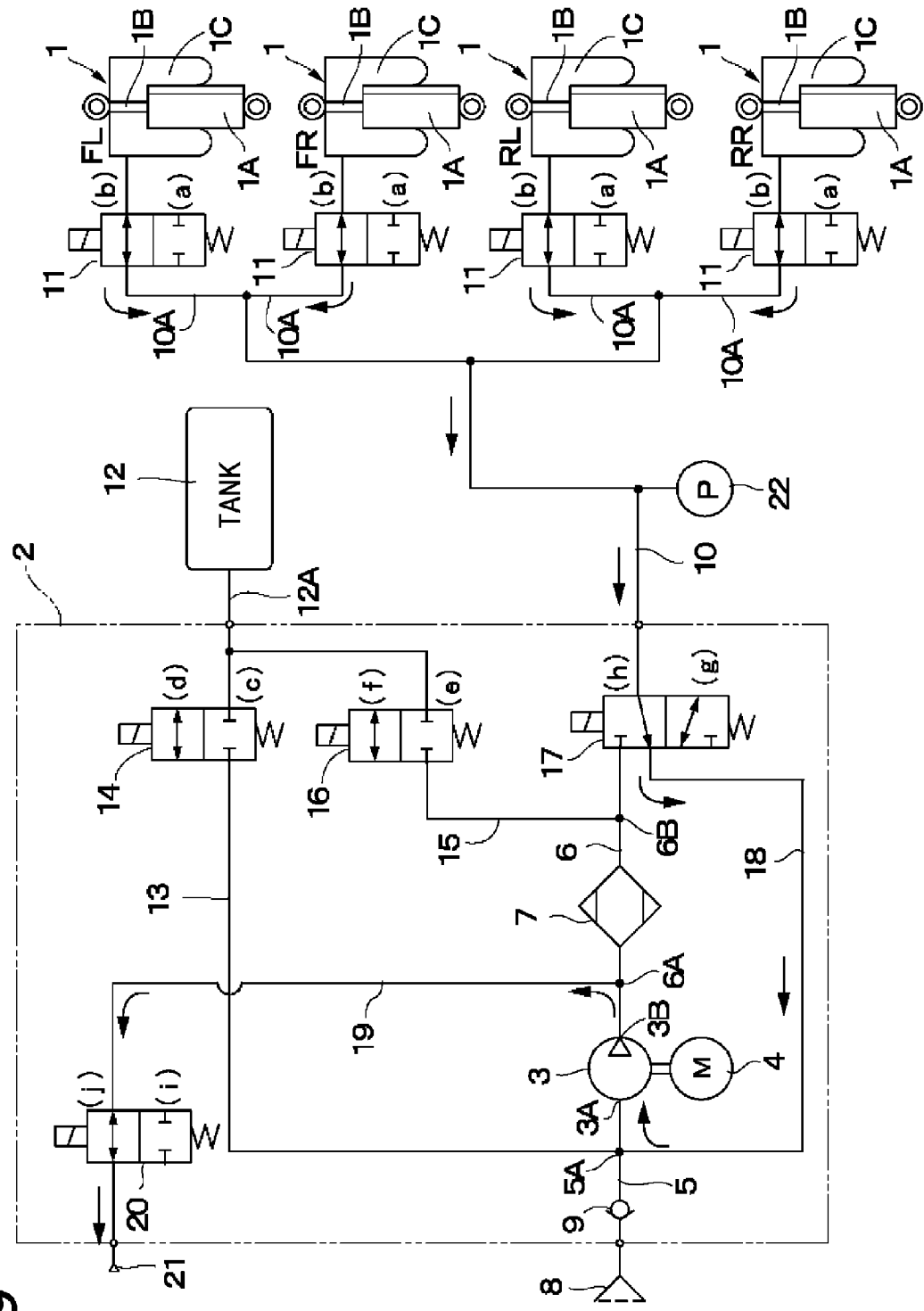
FIG. 9 is a circuit diagram of the air suspension system illustrating a state where compressed air is forcibly discharged from the air suspension toward an outside to rapidly lower the vehicle height.

FIG. 9 illustrates a case in which compressed air is forcibly exhausted from the air chamber 1C of the air suspension 1 toward the outside in order to control the vehicle height lowering at a higher speed. In this case, in order to exhaust from the air suspension 1, the supply/exhaust valve 11 of the air suspension 1 is switched from the valve-closed position (a) to the valve-opened position (b), and the supply/exhaust switching valve 17 is switched from the supply/exhaust position (g) to the circulation position (h). Thereafter, the compressor 3 is driven by the electric motor 4, and the exhaust electromagnetic valve 20 is controlled to be switched from the valve-closed position (i) to the valve-opened position (j).

Therefore, compressed air is sucked from the air chamber 1C of the air suspension 1 to the intake side 3A of the compressor 3 via the supply/exhaust switching valve 17 and the circulation pipeline 18, and may be released from the exhaust port 21 from the ejection side 3B of the compressor 3 to outside air via the exhaust pipeline 19 and the exhaust electromagnetic valve 20. As a result, the compressed air in the air suspension 1 may be forcibly discharged to outside air by the compressor 3, and thus, the vehicle height lowering may be controlled at a high speed.

Figure 16:
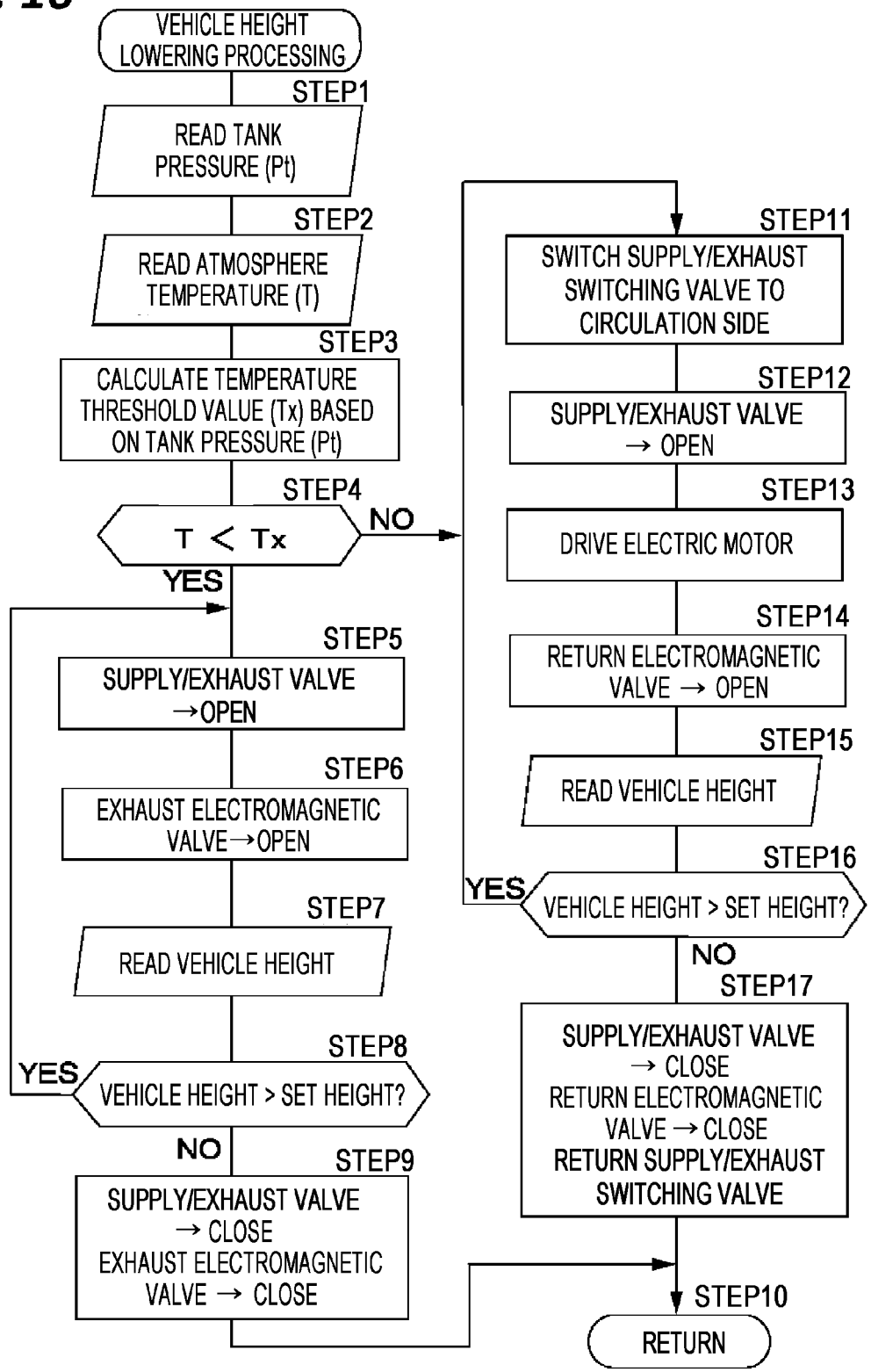
FIG. 16 is a flowchart illustrating a vehicle height lowering control processing by a controller.

FIG. 16 illustrates a vehicle height lowering control processing by the controller 23. That is, when the processing in FIG. 16 is started, in step 1, the pressure in the tank 12 detected by the pressure detector 22, that is, the tank pressure Pt is read. In a state where each supply/exhaust valve 11 illustrated in FIG. 1 is kept at the valve-closed position (a), the return electromagnetic valve 16 is switched from the valve-closed position (e) to the valve-opened position (f), and thus, the pressure detector 22 may detect the pressure in the tank 12. After detecting the pressure (tank pressure Pt) in the tank 12, the return electromagnetic valve 16 is controlled to be returned from the valve-opened position (f) to the valve-closed position (e).

Figure 2:
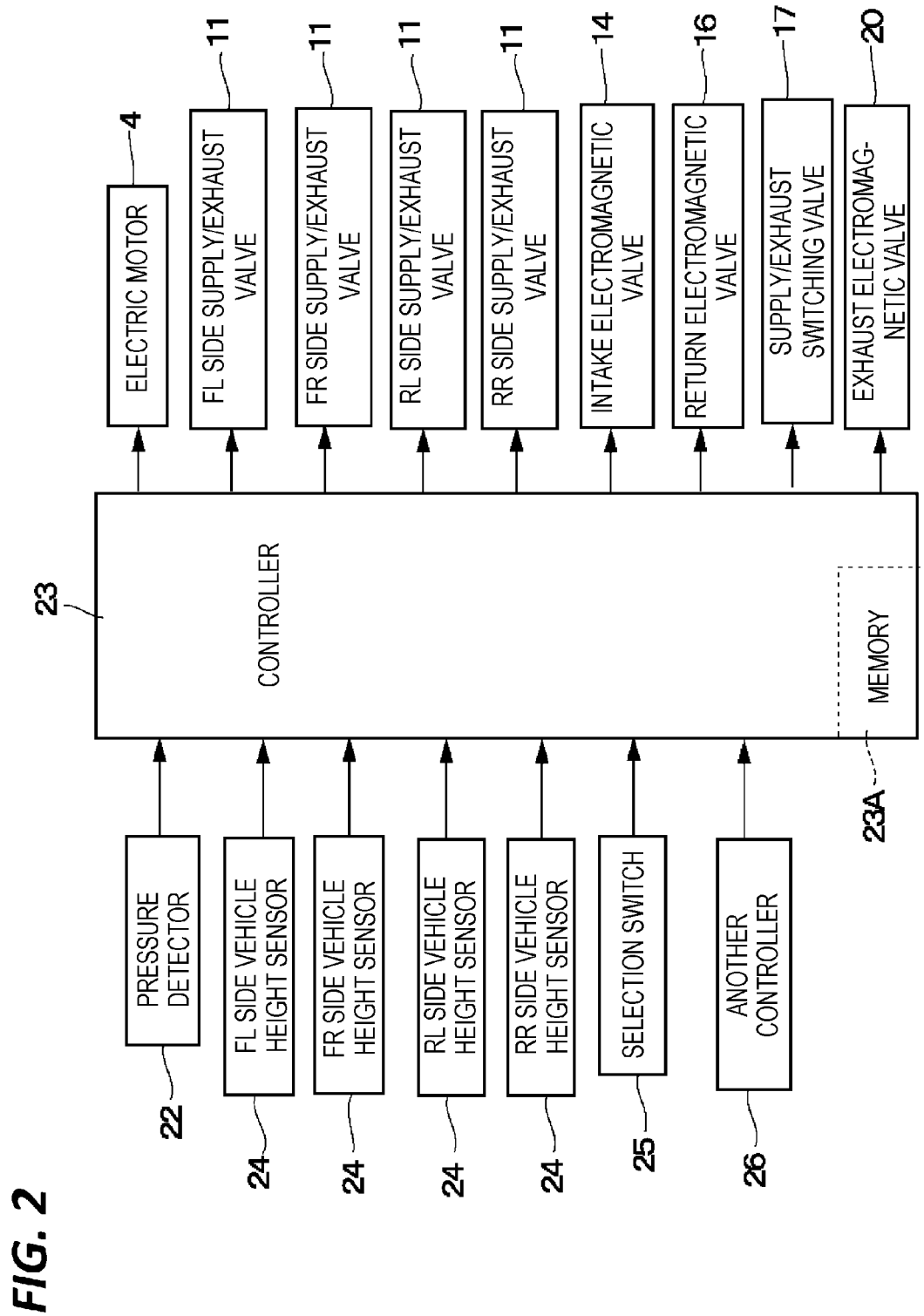
FIG. 2 is a control block diagram of an air suspension system including a controller.

In the next step 2, an ambient atmosphere temperature (T) (outside air temperature) is read as vehicle information from, for example, another controller 26 illustrated in FIG. 2. Then, in the next step 3, the temperature threshold value Tx at this time is calculated based on the tank pressure Pt. That is, the appropriate amount of compressed air for storing the compressed air in the tank 12 may be obtained from the tank pressure Pt and the atmosphere temperature T when the capacity (volume) of the tank 12 is already known. Therefore, when the atmosphere temperature T is lower than the temperature threshold value Tx (T<Tx), compressed air exceeding an appropriate amount is stored in the tank 12, and it is not desirable to increase the stored amount of compressed air any more. Meanwhile, when the atmosphere temperature T is the temperature threshold value Tx or more (T≥Tx), the amount of the compressed air stored in the tank 12 is relatively small, and the capacity of the tank 12 still has a margin.

Therefore, in the next step 4, it is determined whether the atmosphere temperature T is lower than the temperature threshold value Tx (T<Tx), and when it is determined as "YES", compressed air is exhausted to the outside such that the tank 12 is not filled with compressed air any more. That is, in the next step 5, the supply/exhaust valve 11 of the air suspension 1 is switched to the valve-opened position (b), and in the next step 6, the exhaust electromagnetic valve 20 is controlled to be switched from the valve-closed position (i) to the valve-opened position (j). Therefore, as in the exhaust control illustrated in FIG. 7, compressed air is directly discharged from the air chamber 1C of the air suspension 1 to outside air via the supply/exhaust pipeline 6, the exhaust pipeline 19, and the exhaust electromagnetic valve 20.

As a result, the air chamber 1C of the air suspension 1 may be reduced and the vehicle height lowering speed at the time of lowering the vehicle height may be increased. Further, since the compressed air discharged from the air suspension 1 (air chamber 1C) at this time flows back in the air dryer 7 through the supply/exhaust pipeline 6, the moisture adsorbent in the air dryer 7 is regenerated by passing the dried air of the air suspension 1, and the air dryer 7 may be efficiently regenerated.

In the next step 7, the vehicle height is read by the detection signal from the vehicle height sensor 24. Then, in step 8, it is determined whether the vehicle height is higher than the target vehicle height (set height). When it is determined as "YES" in step 8, the vehicle height is higher than the set height, and the vehicle height is not lowered to the target vehicle height, and thus, the processing returns to step 5 and the subsequent processing is continued.

Meanwhile, when it is determined as "NO" in step 8, the vehicle height is the set height or lower, and it may be determined that the vehicle height is lowered to reach the target vehicle height. As a result, in the next step 9, the vehicle height lowering operation by the air suspension 1 is stopped. That is, in the processing in step 9, in a state where the vehicle height reaches the target vehicle height, the supply/exhaust valve 11 is controlled to be placed at the valve-closed position (a), and the exhaust electromagnetic valve 20 is controlled to be returned to the valve-closed position (i). The processing returns to the next step 10 while the supply/exhaust switching valve 17 is placed at the supply/exhaust position (g).

When it is determined as "NO" in step 4, it is the case in which the atmosphere temperature T is the temperature threshold value Tx or more (T≥Tx), and the amount of the compressed air stored in the tank 12 is relatively small, and thus, it may be determined that the capacity of the tank 12 still has a margin. That is, as in the case of the vehicle height lowering illustrated in FIG. 8, it is the case in which compressed air is exhausted from the air chamber 1C of the air suspension 1 toward the tank 12 to increase the amount of the compressed air stored in the tank 12.

Therefore, in the next step 11, in order to control the exhaust from the air suspension 1 as illustrated in FIG. 8, the supply/exhaust switching valve 17 is switched from the supply/exhaust position (g) to the circulation position (h). Then, in step 12, the supply/exhaust valve 11 of the air suspension 1 is switched from the valve-closed position (a) to the valve-opened position (b), and in step 13, the compressor 3 is driven by the electric motor 4. In step 14, the return electromagnetic valve 16 is controlled to be switched from the valve-closed position (e) to the valve-opened position (f). Therefore, while driving the compressor 3, compressed air may be exhausted from the inside of the air chamber 1C of the air suspension 1 via the circulation pipeline 18, the compressor 3, the supply/exhaust pipeline 6, and the tank pipeline 15 to fill the tank 12, and thus, the air suspension 1 may be operated in the vehicle height lowering direction.

In the next step 15, the vehicle height is read by the detection signal from the vehicle height sensor 24, and in the next step 16, it is determined whether the vehicle height is higher than the target vehicle height (set height). Then, when it is determined as "YES" in step 16, the vehicle height is higher than the set height, and is not lowered to the target vehicle height, and thus, the processing returns to step 11 and the subsequent processing is continued. Meanwhile, when it is determined as "NO" in step 16, the vehicle height is the set height or lower, and it may be determined that the vehicle height is lowered to reach the target vehicle height.

As a result, in the next step 17, the vehicle height lowering operation by the air suspension 1 is stopped. That is, in the processing in step 17, in a state where the vehicle height reaches the target vehicle height, the supply/exhaust valve 11 is controlled to be placed at the valve-closed position (a), and the return electromagnetic valve 16 is controlled to be returned to the valve-closed position (e). Further, the supply/exhaust switching valve 17 is switched from the circulation position to the supply/exhaust position (g) (h) so as to return to the original position while the exhaust electromagnetic valve 20 is kept at the valve-closed position (i). Then, the processing returns to the next step 10.

In this manner, according to the embodiment, the air suspension system includes: the air suspension 1 interposed between the vehicle body and the axle to adjust the vehicle height according to supply and exhaust of air; the compressor 3 that compresses air; the tank 12 that stores the air compressed by the compressor 3; and the air dryer 7 provided on the ejection side of the compressor 3. When the tank 12 has a predetermined pressure (e.g., any one of the target pressures illustrated in FIGS. 10 to 14) or less after air is supplied from the tank 12 to the air suspension 1, the pressure of the tank 12 is increased to the target pressure by the compressor 3.

Therefore, for example, after air is supplied to the air suspension 1 (air chamber 1C) by starting the engine of the vehicle, when the pressure in the tank 12 is reduced below a predetermined pressure (e.g., a predetermined target pressure), the compressed air from the compressor 3 may be supplied into the tank 12, and the pressure in the tank 12 may be raised to the target pressure. As a result, even when the load weight increases and the vehicle height is lowered before the vehicle travels, the vehicle height may be raised by the compressor 3 with the compressed air from the tank 12, and the vehicle height adjustment may be performed in a short time.

That is, also after the initial vehicle height adjustment after the vehicle engine is started, the load weight may increase by luggage or occupants and the vehicle height may be lowered before the vehicle starts traveling on the road. Also in this case, for example, as illustrated in FIG. 4, the compressor 3 may take in compressed air from the tank 12 and quickly supply the compressed air having a higher pressure to the air suspension 1, and the time required to raise the vehicle height to the reference height may be shortened and workability at the time of the vehicle height adjustment may be improved.

Further, in the embodiment, a predetermined pressure (target pressure) of the tank 12 is set to a pressure that is variably set by the atmosphere temperature (outside air temperature), for example, as illustrated in the characteristic line 35 illustrated in FIG. 10. Therefore, since the pressure of the compressed air stored in the tank 12 increases or decreases according to the outside air temperature, the target pressure of the tank 12 is variably set as illustrated in the characteristic line 35 illustrated in FIG. 10. As a result, the amount (weight) of the compressed air in the tank 12 may be kept substantially constant without being affected by the outside air temperature. Therefore, at the time of the subsequent vehicle height adjustment, compressed air may be stored in the state where the compressed air having the target pressure is secured in the tank 12.

Further, in the embodiment, the intake side 3A and the ejection side 3B of the compressor 3 and the tank 12 are connected via, for example, the intake electromagnetic valve 14 and the return electromagnetic valve 16 including an ON/OFF type two-way electromagnetic valve. Then, when the intake electromagnetic valve 14 and the return electromagnetic valve 16 are closed (demagnetization state of the solenoid), since the tank 12 is blocked from the compressor 3 and the air suspension 1, the risk of air leakage of the compressed air stored (accumulated) in the tank 12 is reliably reduced. Therefore, the number of times outside air is compressed by the compressor 3 may be reduced, and as a result, the regeneration frequency of the air dryer 7 may be reduced.

Meanwhile, the embodiment includes the vehicle height detecting units (e.g., FL side, FR side, RL side, and RR side vehicle height sensors 24) configured to estimate or measure the vehicle height of the vehicle body, and a predetermined pressure (target pressure) of the tank 12 is set to a pressure variably set by the detected values of the vehicle height detecting units. For example, when the vehicle height at the time of the start of air supply immediately after the engine start is low, it may be presumed to be a case in which compressed air is leaked slightly by any chance from, for example, the air chamber 1C of the air suspension 1, and thus, the vehicle height is lowered.

Therefore, for example, as illustrated in the characteristic line 36 illustrated in FIG. 11, when the vehicle height at the start of air supply is low, it is considered that air leakage has occurred, and the target pressure of the compressed air stored in the tank 12 is set high. Therefore, before traveling on the road, the time required to raise the vehicle height to the reference height may be shortened and workability at the time of the vehicle height adjustment may be improved.

Further, the embodiment includes the first passage (tank pipeline 15) that returns the compressed air in the air suspension 1 to the tank 12 via the return valve (return electromagnetic valve 16) and the second passage (exhaust pipeline 19) that is connected to the air suspension 1 or the tank 12, and is provided with the exhaust electromagnetic valve 20 that is opened to atmosphere via the air dryer 7. For example, as illustrated in FIG. 16, when the compressed air in the air suspension 1 is exhausted to perform the vehicle height lowering control, the return electromagnetic valve 16 or the exhaust electromagnetic valve 20 is switched according to the atmosphere temperature T in step 2.

Therefore, it is determined whether the atmosphere temperature T is lower than the temperature threshold value Tx in step 4, and when it is determined to be lower than the temperature threshold value Tx (T<Tx), it is not desirable to increase the amount of the compressed air stored in the tank 12 any more, and thus, as in the exhaust control illustrated in FIG. 7, compressed air is directly discharged from the air chamber 1C of the air suspension 1 to outside air via the supply/exhaust pipeline 6, the exhaust pipeline 19, and the exhaust electromagnetic valve 20. As a result, the air chamber 1C of the air suspension 1 may be reduced and the vehicle height lowering speed at the time of lowering the vehicle height may be increased. Further, since the compressed air discharged from the air suspension 1 (air chamber 1C) at this time flows back in the air dryer 7 through the supply/exhaust pipeline 6, the moisture adsorbent in the air dryer 7 is regenerated by passing the dried air of the air suspension 1, and the air dryer 7 may be regenerated.

With regard to this, when the above mentioned atmosphere temperature T is the temperature threshold value Tx or more (T≥Tx), the amount of the compressed air stored in the tank 12 is relatively small, that is, for example, as in the case of the vehicle height lowering illustrated in FIG. 8, it is the case in which compressed air is exhausted from the air chamber 1C of the air suspension 1 toward the tank 12, and the amount of the compressed air in the tank 12 may be increased. Therefore, in this case, in the state where the return electromagnetic valve 16 is opened, and the supply/exhaust switching valve 17 is switched to the circulation position (h), the compressor 3 is driven, and compressed air may be exhausted from the air chamber 1C of the air suspension 1 to fill the tank 12, and thus, the air suspension 1 may be operated in the vehicle height lowering direction.

Then, when the controller 23 determines that the target vehicle height has been reached based on the detection signal from the vehicle height sensor 24 by the processing of step 8 or step 16 in FIG. 16, in order to end the vehicle height lowering operation, a control signal is output so as to demagnetize the solenoid of the supply/exhaust valve 11, and the supply/exhaust valve 11 is returned to the valve-closed position (a). Therefore, since the supply/exhaust pipeline 6 of the compressor 3 is blocked with respect to the air chamber 1C of the air suspension 1, the air suspension 1 is operated as an air spring so as to maintain the target vehicle height, and the state where the vehicle height is lowered as described above may be kept.

Further, when the absolute time information (i.e., absolute time information, which is the stop time of the vehicle) is a predetermined value or more, air is supplied from the tank 12 to the air suspension 1, and then, the pressure of the tank 12 is increased by the compressor 3. That is, as illustrated in the characteristic line 40 illustrated in FIG. 15, the target pressure of the compressed air stored in the tank 12 is set to a relationship that is proportional to the stop (parking) time of the vehicle. Therefore, the target pressure of the compressed air stored in the tank 12 may be variably set corresponding to the absolute time information of the vehicle stop, and thus, the compressed air in the tank 12 is used to quickly deal with before traveling on the road, and workability at the time of the vehicle height adjustment may be improved.

In this case, when the absolute time information (e.g., stop time of the vehicle) is a predetermined value (e.g., half a month to a month) or larger, as illustrated in the control illustrated in FIG. 4, after air is supplied from the tank 12 to the air suspension 1, the compressor 3 may be operated to increase the pressure of the tank 12, and the target pressure at this time may be set based on the characteristic line 40 illustrated in FIG. 15.

Furthermore, the air suspension system according to the embodiment may store the compressed air in the tank 12, and a closed circuit (closed type) that may supply the compressed air stored in the tank 12 to the air suspension 1 while the compressed air is further compressed by the compressor 3 may be implemented. Further, the compressed air discharged from the air chamber 1C of the air suspension 1 may be returned to and stored in the tank 12 using the return electromagnetic valve 16 without being discharged to the atmosphere, and thus the compressed air may be effectively used without being wastefully released.

Further, in the air suspension system according to the embodiment, since the compressor 3 sucks and compresses the compressed air in the tank 12, the frequency of sucking air from the outside atmosphere (i.e., frequency of opening the intake valve 9) may be significantly reduced, and the occurrence frequency of problems caused by sucking dust or moisture in the atmosphere may be reduced. Further, as compared with the closed type in the related art, it is not necessary to perform, for example, pressure control by using, particularly a pressure sensor, and it is not necessary to perform complicated control, and thus, the entire configuration may be simplified.

Therefore, according to the embodiment, when the pressure of the tank 12 is a predetermined pressure (e.g., target pressure) or less after air is supplied from the tank 12 to the air suspension 1, the pressure of the tank 12 is increased to the target pressure by the compressor 3. Therefore, even in the case where, after the initial vehicle height adjustment after the engine is started, the load weight increases by luggage or occupants and the vehicle height is lowered before the vehicle starts traveling on the road, for example, the compressor 3 may take in compressed air from the tank 12 and quickly supply the compressed air having a higher pressure to the air suspension 1, and the time required to raise the vehicle height to the reference height may be shortened and workability at the time of the vehicle height adjustment may be improved. As a result, the pressure required for the system may be maintained, and the time spent for adjusting the vehicle height may be shortened, thereby stabilizing the vehicle.

Furthermore, in the embodiment, since the normal use range as the air suspension system is established by the closed system, the vehicle height raising time during high-frequency use may be shortened. Then, when the vehicle height adjustment range becomes larger than the normal use range, it is possible to take in atmosphere (open the intake valve 9) or release compressed air to the atmosphere (open the exhaust electromagnetic valve 20) as needed.

In the embodiment, the case in which the intake electromagnetic valve 14, the return electromagnetic valve 16, and the exhaust electromagnetic valve 20 are configured to have a function as a relief valve (safety valve) has been described as an example. However, the intake electromagnetic valve 14, the return electromagnetic valve 16, and the exhaust electromagnetic valve 20 do not necessarily have to be operated as a relief valve, and each valve may be configured by using an electromagnetic type switching valve that does not have relief function.

Further, in the embodiment, the case in which the pressure in the air chamber 1C or the tank 12 is detected by using the pressure detector 22 such as a pressure sensor has been described as an example. However, the present disclosure is not limited thereto, and the pressure in the air chamber 1C or the tank 12 may be estimated from the changed state of the vehicle height by, for example, using the detection signal of the vehicle height sensor 24, and in that case, the pressure detector 22 may be unnecessary.

Further, in the embodiment, the case in which the intake port 8 and the exhaust post 21 are separately provided to be apart from each other with respect to the compressor device 2 has been described as an example. However, the present disclosure is not limited thereto, and for example, the exhaust pipeline 19 may be used as a bypass passage for the compressor 3, and the tip end side of the bypass passage may be connected to the intake pipeline (e.g., between the intake valve 9 and the intake port 8) to configure the intake port to be an intake/exhaust port that also serves as an exhaust port.

As the air suspension system based on the embodiment described above, for example, an aspect described below may be considered. That is, as a first aspect, an air suspension system includes: an air suspension interposed between a vehicle body and an axle to adjust a vehicle height according to supply and exhaust of air; a compressor that compresses air; a tank that stores the air compressed by the compressor; and an air dryer provided on an ejection side of the compressor. When the tank has a predetermined pressure or less after air is supplied from the tank to the air suspension, a pressure of the tank is increased by the compressor.

Further, as a second aspect, according to the first aspect, a predetermined pressure of the tank is variable. As a third aspect, according to the second aspect, the predetermined pressure of the tank is a pressure variably set according to the atmosphere temperature. As a fourth aspect, according to the second aspect, a vehicle height detecting unit that estimates or measures the vehicle height of the vehicle body is provided, and the predetermined pressure of the tank is a pressure variably set according to a detected value of the vehicle height detecting unit.

As a fifth aspect, according to the first aspect, a first passage that returns compressed air in the air suspension to the tank via a return valve; and a second passage that is connected to the air suspension or the tank, and is provided with an exhaust valve that is opened to atmosphere via the air dryer are provided, and, when the compressed air in the air suspension is exhausted, the return valve or the exhaust valve is switched according to an atmosphere temperature. As a sixth aspect, according to the first aspect, when absolute time information is equal to or higher than a predetermined value, air is supplied from the tank to the air suspension, and then, the pressure of the tank is increased by the compressor.

DESCRIPTION OF SYMBOLS

1: air suspension
2: compressor device
3: compressor
4: electric motor
5: intake pipeline
6: supply/exhaust pipeline
7: air dryer
9: intake valve
10: air conduit
11: supply/exhaust valve
12: tank
13: tank side suction pipeline
14: intake electromagnetic valve (intake switching valve)
15: tank pipeline (first passage)
16: return electromagnetic valve (exhaust valve)
17: supply/exhaust switching valve
18: circulation pipeline
19: exhaust pipeline (second passage)
20: exhaust electromagnetic valve (exhaust valve)
22: pressure detector
23: controller (control device)
24: vehicle height sensor (vehicle height detecting unit)

What is claimed is:

1. An air suspension system for a vehicle comprising:
   an air suspension interposed between a vehicle body and an axle and configured to adjust a vehicle height according to supply and exhaust of air;
   a compressor configured to compress air;
   a tank configured to store the air compressed by the compressor; and
   an air dryer provided on an ejection side of the compressor,
   wherein a target pressure of the tank storing the air compressed by the compressor is set according to the vehicle height and a pressure of the tank after an engine is started and before air is supplied to the air suspension.

2. The air suspension system according to claim 1, wherein, when the pressure of the tank is a predetermined pressure or less after air is supplied from the tank to the air suspension, the pressure of the tank is increased by the compressor.

3. The air suspension system according to claim 2, wherein the predetermined pressure of the tank is a pressure variably set according to an atmosphere temperature.

4. The air suspension system according to claim 2, further comprising:
a vehicle height detector configured to estimate or measure the vehicle height of the vehicle body,
wherein the predetermined pressure of the tank is a pressure variably set according to a detected value of the vehicle height detector.

5. The air suspension system according to claim 1, further comprising:
a first passage configured to return the air compressed in the air suspension to the tank via a return valve; and
a second passage connected to the air suspension or the tank, and provided with an exhaust valve that is opened to atmosphere via the air dryer,
wherein, when the air compressed in the air suspension is exhausted, the return valve or the exhaust valve is switched according to an atmosphere temperature.

6. The air suspension system according to claim 1, wherein, when an elapsed time from when a vehicle is stopped to when the vehicle is driven is equal to or higher than a predetermined time, air is supplied from the tank to the air suspension, and then, the pressure of the tank is increased by the compressor.

7. The air suspension system according to claim 2, wherein the predetermined pressure of the tank is a pressure variably set according to a suspension pressure at a reference vehicle height.

8. The air suspension system according to claim 2, wherein the predetermined pressure of the tank is a pressure variably set according to a number of occupants.

9. The air suspension system according to claim 2, wherein the predetermined pressure of the tank is a pressure variably set according to a set vehicle height being higher or lower than a normal reference vehicle height.

* * * * *